(12) United States Patent
Dharne

(10) Patent No.: US 11,468,885 B2
(45) Date of Patent: *Oct. 11, 2022

(54) SYSTEM AND METHOD FOR CONVERSATIONAL AGENT VIA ADAPTIVE CACHING OF DIALOGUE TREE

(71) Applicant: DMAI, Inc., Los Angeles, CA (US)

(72) Inventor: Ashwin Dharne, Irvinie, CA (US)

(73) Assignee: DMAI, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,301

(22) Filed: Feb. 15, 2019

(65) Prior Publication Data

US 2019/0251965 A1 Aug. 15, 2019

Related U.S. Application Data

(60) Provisional application No. 62/630,983, filed on Feb. 15, 2018.

(51) Int. Cl.
*G10L 15/22* (2006.01)
*G10L 15/18* (2013.01)
*G10L 15/30* (2013.01)
*G06F 3/01* (2006.01)
*G10L 15/06* (2013.01)
(Continued)

(52) U.S. Cl.
CPC .............. *G10L 15/22* (2013.01); *G06F 3/011* (2013.01); *G06V 20/10* (2022.01); *G06V 40/174* (2022.01); *G10L 15/063* (2013.01); *G10L 15/183* (2013.01); *G10L 15/1807* (2013.01);
(Continued)

(58) Field of Classification Search
CPC .............. G06F 3/167; G06F 17/30958; G06F 17/90332; G06F 17/279; G10L 15/1815
See application file for complete search history.

(56) References Cited

U.S. PATENT DOCUMENTS 6,418,440 B1 * 7/2002 Kuo ..................... G06F 16/3329
8,112,151 B1 * 2/2012 Cogan ................ A61N 1/37247
607/32

(Continued)

OTHER PUBLICATIONS

International Search Report and Written Opinion dated Apr. 24, 2019 in International Application PCT/US2019/018217.

(Continued)

*Primary Examiner* — Anne L Thomas-Homescu
(74) *Attorney, Agent, or Firm* — Venable LLP

(57) ABSTRACT

The present teaching relates to method, system, medium, and implementations for managing a user machine dialogue. A request is received by a server from a device for a response to be directed to a user engaged in a dialogue with the device. The request includes information related to a current state of the dialogue. The response is determined based on a dialogue tree and the information related to the current state of the dialogue. A sub-dialogue tree, which corresponds to a portion of the dialogue tree, is then created based on the response and the dialogue tree and is then used to generate a local dialogue manager for the device. The response, the sub-dialogue tree, and the local dialogue manager are then sent to the device, wherein the local dialogue manager, once deployed on the device, is capable of driving the dialogue with the user based on the sub-dialogue tree on the device.

20 Claims, 29 Drawing Sheets

(51) Int. Cl.
*G10L 15/183* (2013.01)
*G06V 20/10* (2022.01)
*G06V 40/16* (2022.01)
*G10L 25/63* (2013.01)

(52) U.S. Cl.
CPC .............. *G10L 15/30* (2013.01); *G10L 25/63* (2013.01); *G10L 2015/226* (2013.01); *G10L 2015/227* (2013.01)

(56) References Cited

U.S. PATENT DOCUMENTS

| | | | | |
|---|---|---|---|---|
| 8,418,000 | B1* | 4/2013 | Salame | G06F 11/3684 714/38.1 |
| 8,566,102 | B1* | 10/2013 | Bangalore | G10L 15/22 704/270.1 |
| 9,667,786 | B1* | 5/2017 | Dube | H04M 3/5183 |
| 9,953,637 | B1* | 4/2018 | Di Fabbrizio | G10L 15/22 |
| 10,878,808 | B1* | 12/2020 | Mathias | G06F 16/90332 |
| 10,963,493 | B1* | 3/2021 | Hu | G06N 3/088 |
| 2002/0138266 | A1* | 9/2002 | Ross | G10L 15/1822 704/251 |
| 2003/0007609 | A1* | 1/2003 | Yuen | H04M 3/4938 379/88.16 |
| 2004/0068406 | A1* | 4/2004 | Maekawa | H04N 7/14 704/235 |
| 2004/0083092 | A1* | 4/2004 | Valles | G06F 40/30 704/9 |
| 2004/0176958 | A1* | 9/2004 | Salmenkaita | H04M 3/4938 704/275 |
| 2006/0184370 | A1* | 8/2006 | Kwak | G10L 15/1822 704/275 |
| 2007/0186184 | A1* | 8/2007 | Berstis | G06F 16/9558 715/810 |
| 2007/0192910 | A1* | 8/2007 | Vu | G05D 1/0274 700/245 |
| 2008/0140634 | A1* | 6/2008 | Williams | G06F 16/90335 |
| 2008/0159495 | A1* | 7/2008 | Dahan | G10L 25/51 379/93.01 |
| 2009/0006083 | A1* | 1/2009 | Bachand | G10L 15/22 704/201 |
| 2009/0037175 | A1* | 2/2009 | Wang | G10L 15/1822 704/251 |
| 2009/0055165 | A1* | 2/2009 | Jindal | G06F 40/56 704/9 |
| 2009/0125609 | A1 | 5/2009 | Wood et al. | |
| 2009/0228277 | A1* | 9/2009 | Bonforte | G06F 16/632 704/246 |
| 2010/0042409 | A1* | 2/2010 | Hutchinson | H04M 3/4938 704/235 |
| 2010/0318536 | A1* | 12/2010 | Bandholz | G06F 16/9027 707/759 |
| 2011/0071830 | A1* | 3/2011 | Kim | G06K 9/00335 704/246 |
| 2011/0238408 | A1* | 9/2011 | Larcheveque | G06F 40/284 704/9 |
| 2011/0238410 | A1* | 9/2011 | Larcheveque | G06F 16/355 704/9 |
| 2012/0089394 | A1* | 4/2012 | Teodosiu | G06F 40/00 704/235 |
| 2012/0259807 | A1* | 10/2012 | Dymetman | G06F 17/18 706/50 |
| 2014/0092007 | A1* | 4/2014 | Kim | G10L 15/30 345/156 |
| 2014/0172914 | A1* | 6/2014 | Elnikety | G06F 16/9024 707/774 |
| 2014/0278411 | A1* | 9/2014 | Cheung | G10L 15/18 704/240 |
| 2014/0324648 | A1* | 10/2014 | Mori | G06F 3/167 705/31 |
| 2014/0358263 | A1* | 12/2014 | Irmler | G06F 3/014 700/94 |
| 2015/0039316 | A1* | 2/2015 | Tzirkel-Hancock | G10L 15/1815 704/275 |
| 2015/0142704 | A1* | 5/2015 | London | G06N 5/022 706/11 |
| 2015/0149391 | A1* | 5/2015 | Ziolko | G06N 3/006 706/11 |
| 2015/0199967 | A1* | 7/2015 | Reddy | G10L 15/22 704/249 |
| 2015/0331666 | A1* | 11/2015 | Bucsa | G10L 15/22 704/275 |
| 2016/0078747 | A1* | 3/2016 | King | G06F 19/00 340/539.12 |
| 2016/0093289 | A1* | 3/2016 | Pollet | G10L 13/027 704/260 |
| 2016/0163311 | A1* | 6/2016 | Crook | G10L 15/065 704/275 |
| 2017/0024375 | A1* | 1/2017 | Hakkani-Tur | G10L 15/1822 |
| 2017/0116173 | A1* | 4/2017 | Lev-Tov | H04M 3/493 |
| 2017/0118336 | A1* | 4/2017 | Tapuhi | H04M 3/4938 |
| 2017/0161665 | A1* | 6/2017 | Iwata | G10L 15/22 |
| 2017/0175169 | A1* | 6/2017 | Lee | G16H 50/20 |
| 2017/0235825 | A1 | 8/2017 | Gordon | |
| 2017/0286383 | A1* | 10/2017 | Koul | A61F 9/08 |
| 2018/0158452 | A1* | 6/2018 | Kothuvatiparambil | H04M 3/4936 |
| 2018/0165691 | A1* | 6/2018 | Heater | G06F 40/205 |
| 2018/0189267 | A1* | 7/2018 | Takiel | G06F 40/205 |
| 2018/0278740 | A1 | 9/2018 | Choi et al. | |
| 2018/0300310 | A1* | 10/2018 | Shinn | G06F 40/289 |
| 2019/0058793 | A1* | 2/2019 | Konig | H04M 3/5183 |
| 2019/0065627 | A1* | 2/2019 | De Mel | G06F 16/9038 |
| 2019/0066660 | A1* | 2/2019 | Liang | G10L 15/02 |
| 2019/0080252 | A1* | 3/2019 | Shinn | G06F 9/4413 |
| 2019/0130900 | A1* | 5/2019 | Tsai | G10L 15/22 |
| 2019/0212879 | A1* | 7/2019 | Anand | G06F 9/451 |
| 2019/0213284 | A1* | 7/2019 | Anand | G06F 9/453 |
| 2019/0228107 | A1* | 7/2019 | Trim | H04L 51/02 |
| 2019/0236205 | A1* | 8/2019 | Jia | G06N 5/02 |
| 2020/0012720 | A1* | 1/2020 | Elson | G06F 40/35 |
| 2020/0019569 | A1* | 1/2020 | Hoshino | G06F 16/9535 |

OTHER PUBLICATIONS

International Search Report and Written Opinion dated Jun. 19, 2019 in International Application PCT/US2019/018226.
International Preliminary Report on Patentability dated Aug. 27, 2020 in International Application PCT/US2019/018217.
International Preliminary Report on Patentability dated Aug. 27, 2020 in International Application PCT/US2019/018226.
Office Action dated Dec. 17, 2021 in U.S. Appl. No. 16/277,271.

* cited by examiner

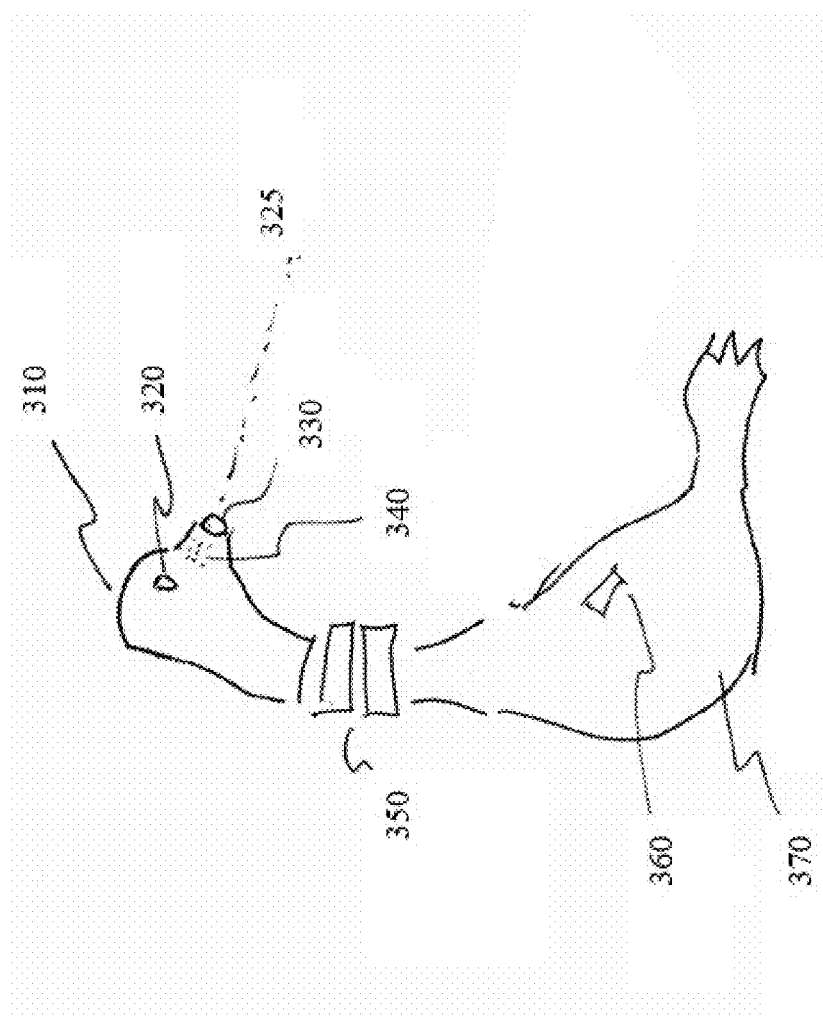

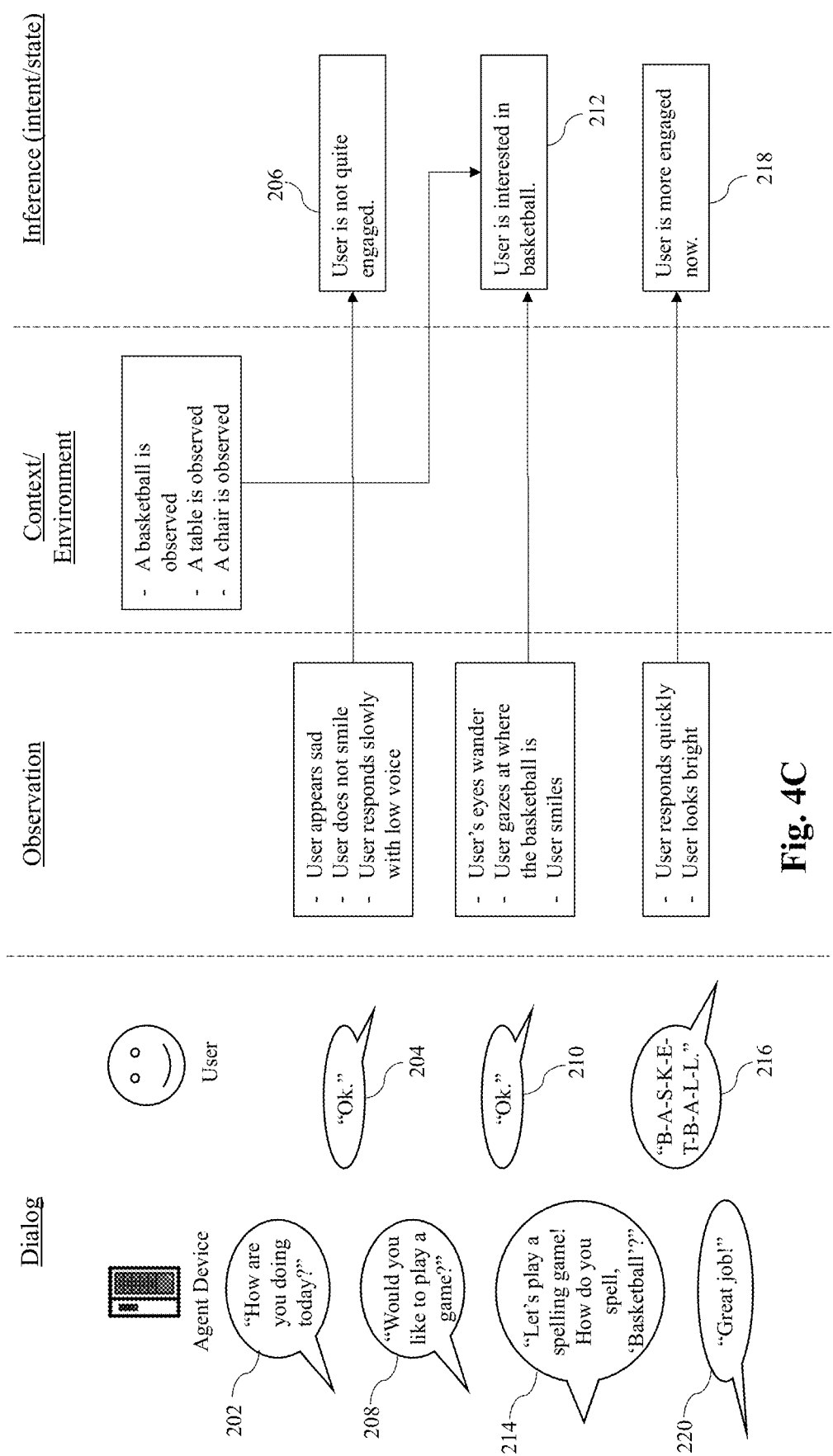

SYSTEM AND METHOD FOR CONVERSATIONAL AGENT VIA ADAPTIVE CACHING OF DIALOGUE TREE

CROSS-REFERENCE TO RELATED APPLICATIONS

This application claims priority to U.S. Provisional Patent Application 62/630,983, filed Feb. 15, 2018, the contents of which are incorporated herein by reference in its entirety.

The present application is related to International Application No. PCT/US2019/018281, filed Feb. 15, 2019, U.S. patent application Ser. No. 16/277,599, filed Feb. 15, 2019, International Application No. PCT/US2019/018277, filed Feb. 15, 2019, U.S. patent application Ser. No. 16/277,562, filed Feb. 15, 2019, International Application No. PCT/US2019/018270, filed Feb. 15, 2019, U.S. patent application Ser. No. 16/277,535, filed Feb. 15, 2019, International Application No. PCT/US2019/018253, filed Feb. 15, 2019, U.S. patent application Ser. No. 16/277,469, filed Feb. 15, 2019, International Application No. PCT/US2019/018209, filed Feb. 15, 2019, U.S. patent application Ser. No. 16/276,950, filed Feb. 15, 2019, International Application No. PCT/US2019/018264, filed Feb. 15, 2019, U.S. patent application Ser. No. 16/277,505, filed Feb. 15, 2019, International Application No. PCT/US2019/018212, filed Feb. 15, 2019, U.S. patent application Ser. No. 16/277,032, filed Feb. 15, 2019, International Application No. PCT/US2019/018217, filed Feb. 15, 2019, U.S. patent application Ser. No. 16/277,271, filed Feb. 15, 2019, International Application No. PCT/US2019/018226, filed Feb. 15, 2019, International Application No. PCT/US2019/018235, filed Feb. 15, 2019, U.S. patent application Ser. No. 16/277,337, filed Feb. 15, 2019, International Application No. PCT/US2019/018242, filed Feb. 15, 2019, U.S. patent application Ser. No. 16/277,381, filed Feb. 15, 2019, International Application No. PCT/US2019/018248, filed Feb. 15, 2019, U.S. patent application Ser. No. 16/277,418, filed Feb. 15, 2019, International Application No. PCT/US2019/018215, filed Feb. 15, 2019, U.S. patent application Ser. No. 16/277,136, filed Feb. 15, 2019, which are hereby incorporated by reference in their entireties.

BACKGROUND

1. Technical Field

The present teaching generally relates to computer. More specifically, the present teaching relates to computerized dialogue agent.

2. Technical Background

With advancement of artificial intelligence technologies and the explosion Internet based communications because of the ubiquitous Internet's connectivity, computer aided dialogue systems have become increasingly popular. For example, more and more call centers deploy automated dialogue robot to handle customer calls. Hotels started to install various kiosks that can answer questions from tourists or guests. Online bookings (whether travel accommodations or theater tickets, etc.) are also more frequently done by chatbots. In recent years, automated human machine communications in other areas are also becoming more and more popular.

Such traditional computer aided dialogue systems are usually pre-programmed with certain questions and answers based on commonly known patterns of conversations in different domains. Unfortunately, human conversant can be unpredictable and sometimes does not follow a pre-planned dialogue pattern. In addition, in certain situations, a human conversant may digress during the process and continue the fixed conversation patterns likely will cause irritation or loss of interests. When this happens, such machine traditional dialogue systems often will not be able to continue to engage a human conversant so that the human machine dialogue either has to be aborted to hand the tasks to a human operator or the human conversant simply leaves the dialogue, which is undesirable.

In addition, traditional machine based dialogue systems are often not designed to address the emotional factor of a human, let alone taking into consideration as to how to address such emotional factor when conversing with a human. For example, a traditional machine dialogue system usually does not initiate the conversation unless a human activates the system or asks some questions. Even if a traditional dialogue system does initiate a conversation, it has a fixed way to start a conversation and does not change from human to human or adjusted based on observations. As such, although they are programmed to faithfully follow the pre-designed dialogue pattern, they are usually not able to act on the dynamics of the conversation and adapt in order to keep the conversation going in a way that can engage the human. In many situations, when a human involved in a dialogue is clearly annoyed or frustrated, a traditional machine dialogue systems is completely unaware and continue the conversation in the same manner that has annoyed the human. This not only makes the conversation end unpleasantly (the machine is still unaware of that) but also turns the person away from conversing with any machine based dialogue system in the future.

In some application, conducting a human machine dialogue session based on what is observed from the human is crucially important in order to determine how to proceed effectively. One example is an education related dialogue. When a chatbot is used for teaching a child to read, whether the child is perceptive to the way he/she is being taught has to be monitored and addressed continuously in order to be effective. Another limitation of the traditional dialogue systems is their context unawareness. For example, a traditional dialogue system is not equipped with the ability to observe the context of a conversation and improvise as to dialogue strategy in order to engage a user and improve the user experience.

Thus, there is a need for methods and systems that address such limitations.

SUMMARY

The teachings disclosed herein relate to methods, systems, and programming for computerized dialogue agent.

In one example, a method, implemented on a machine having at least one processor, storage, and a communication platform capable of connecting to a network for managing a user machine dialogue. A request is received by a server from a device for a response to be directed to a user engaged in a dialogue with the device. The request includes information related to a current state of the dialogue. The response is determined based on a dialogue tree and the information related to the current state of the dialogue. A sub-dialogue tree, which corresponds to a portion of the dialogue tree, is then created based on the response and the dialogue tree and is then used to generate a local dialogue manager for the device. The response, the sub-dialogue tree, and the local dialogue manager are then sent to the device, wherein the local dialogue manager, once deployed on the device, is capable of driving the dialogue with the user based on the sub-dialogue tree on the device.

In a different example, a system for managing a user machine dialogue. The system includes a server comprising a device interface unit, a dialogue manager (DM), an updated local dialogue tree (DT), and an updated local dialogue manager (DM) determiner. The device interface unit is configured for receiving a request from a device for a response to be directed to a user engaged in a dialogue between the user and the device, wherein the request includes information related to a current state of the dialogue. The dialogue manager is configured for determining the response based on a dialogue tree and the information related to the current state of the dialogue. The updated local dialogue tree (DT) determiner is configured for creating a sub-dialogue tree based on the response and the dialogue tree, wherein the sub-dialogue tree corresponds to a portion of the dialogue tree. The updated local dialogue manager (DM) determiner is configured for generating a local dialogue manager with respect to the sub-dialogue tree. The device interface unit is further configured for sending the response, the sub-dialogue tree, and the local dialogue manager to the device in response to the request, wherein the local dialogue manager, once deployed on the device, is capable of driving the dialogue with the user based on the sub-dialogue tree on the device.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for managing a user machine dialogue, wherein the medium, when read by the machine, causes the machine to perform a series of steps. A request is received by a server from a device for a response to be directed to a user engaged in a dialogue with the device. The request includes information related to a current state of the dialogue. The response is determined based on a dialogue tree and the information related to the current state of the dialogue. A sub-dialogue tree, which corresponds to a portion of the dialogue tree, is then created based on the response and the dialogue tree and is then used to generate a local dialogue manager for the device. The response, the sub-dialogue tree, and the local dialogue manager are then sent to the device, wherein the local dialogue manager, once deployed on the device, is capable of driving the dialogue with the user based on the sub-dialogue tree on the device.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3B illustrates an exemplary agent device, in accordance with an embodiment of the present teaching;

FIG. 4C illustrates exemplary a human-agent device interaction and exemplary processing performed by the automated companion, according to an embodiment of the present teaching;

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional human machine dialogue systems and to provide methods and systems that enables a more effective and realistic human to machine dialogue. The present teaching incorporates artificial intelligence in an automated companion with an agent device in conjunction with the backbone support from a user interaction engine so that the automated companion can conduct a dialogue based on continuously monitored multimodal data indicative of the surrounding of the dialogue, adaptively estimating the mindset/emotion/intent of the participants of the dialogue, and adaptively adjust the conversation strategy based on the dynamically changing information/estimates/contextual information.

The automated companion according to the present teaching is capable of personalizing a dialogue by adapting in multiple fronts, including, but is not limited to, the subject matter of the conversation, the hardware/components used to carry out the conversation, and the expression/behavior/gesture used to deliver responses to a human conversant. The adaptive control strategy is to make the conversation more realistic and productive by flexibly changing the conversation strategy based on observations on how receptive the human conversant is to the dialogue. The dialogue system according to the present teaching can be configured to achieve a goal driven strategy, including dynamically configuring hardware/software components that are considered most appropriate to achieve an intended goal. Such optimizations are carried out based on learning, including learning from prior conversations as well as from an on-going conversation by continuously assessing a human conversant's behavior/reactions during the conversation with respect to some intended goals. Paths exploited to achieve a goal driven strategy may be determined to remain the human conversant engaged in the conversation even though in some instances, paths at some moments of time may appear to be deviating from the intended goal.

Figure 1:
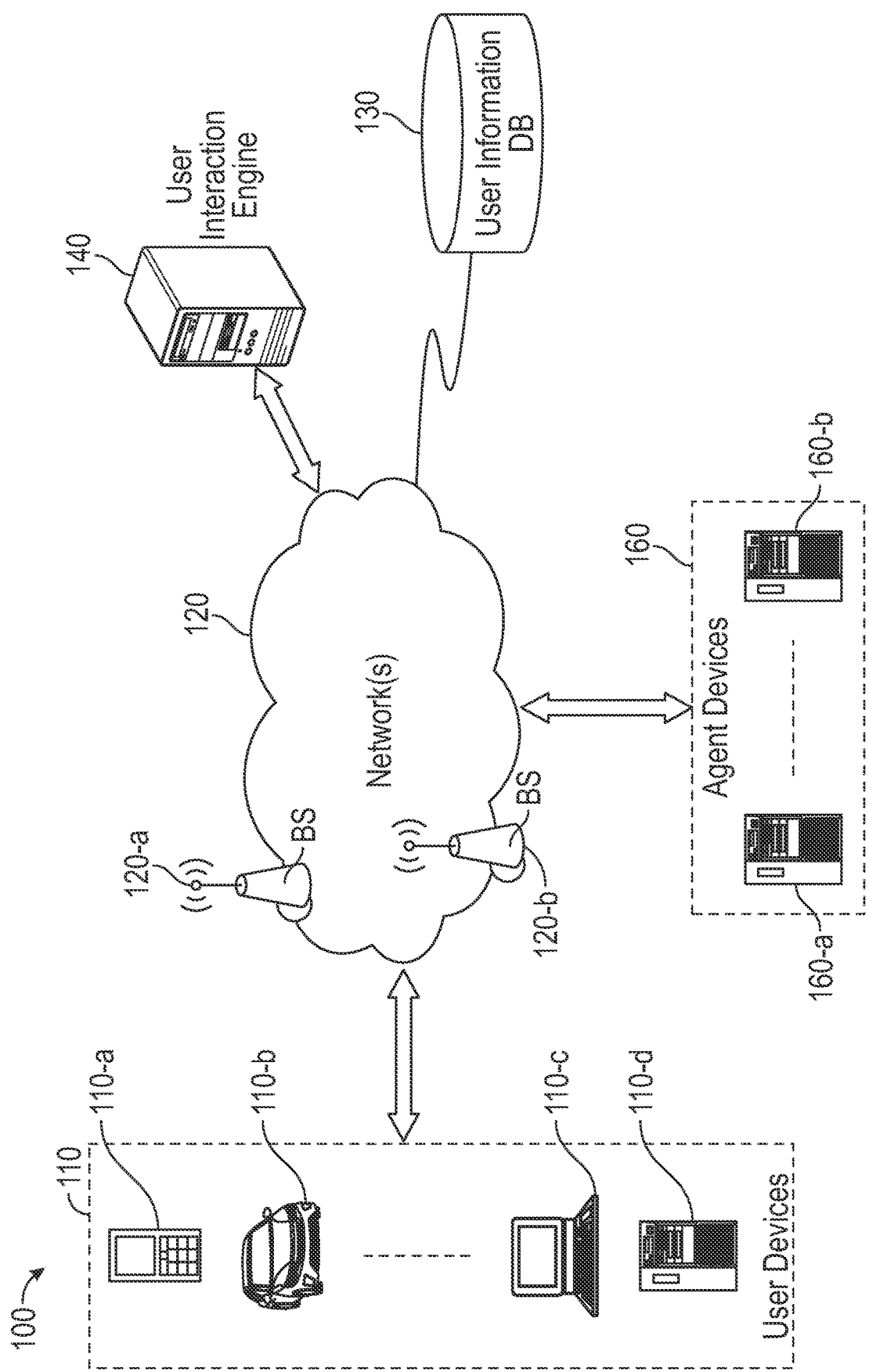
FIG. 1 depicts a networked environment for facilitating a dialogue between a user operating a user device and an agent device in conjunction with a user interaction engine, in accordance with an embodiment of the present teaching.

More specifically, the present teaching discloses a user interaction engine providing backbone support to an agent device to facilitate more realistic and more engaging dialogues with a human conversant. FIG. 1 depicts a networked environment 100 for facilitating a dialogue between a user operating a user device and an agent device in conjunction with a user interaction engine, in accordance with an embodiment of the present teaching. In FIG. 1, the exemplary networked environment 100 includes one or more user devices 110, such as user devices 110-*a*, 110-*b*, 110-*c*, and 110-*d*, one or more agent devices 160, such as agent devices 160-*a*, . . . 160-*b*, a user interaction engine 140, and a user information database 130, each of which may communicate with one another via network 120. In some embodiments, network 120 may correspond to a single network or a combination of different networks. For example, network 120 may be a local area network ("LAN"), a wide area network ("WAN"), a public network, a proprietary network, a proprietary network, a Public Telephone Switched Network ("PSTN"), the Internet, an intranet, a Bluetooth network, a wireless network, a virtual network, and/or any combination thereof. In one embodiment, network 120 may also include various network access points. For example, environment 100 may include wired or wireless access points such as, without limitation, base stations or Internet exchange points 120-*a*, . . . , 120-*b*. Base stations 120-*a* and 120-*b* may facilitate, for example, communications to/from user devices 110 and/or agent devices 160 with one or more other components in the networked framework 100 across different types of network.

A user device, e.g., 110-*a*, may be of different types to facilitate a user operating the user device to connect to network 120 and transmit/receive signals. Such a user device 110 may correspond to any suitable type of electronic/computing device including, but not limited to, a desktop computer (110-*d*), a mobile device (110-*a*), a device incorporated in a transportation vehicle (110-*b*), . . . , a mobile computer (110-*c*), or a stationary device/computer (110-*d*). A mobile device may include, but is not limited to, a mobile phone, a smart phone, a personal display device, a personal digital assistant ("PDAs"), a gaming console/device, a wearable device such as a watch, a Fitbit, a pin/broach, a headphone, etc. A transportation vehicle embedded with a device may include a car, a truck, a motorcycle, a boat, a ship, a train, or an airplane. A mobile computer may include a laptop, an Ultrabook device, a handheld device, etc. A stationary device/computer may include a television, a set top box, a smart household device (e.g., a refrigerator, a microwave, a washer or a dryer, an electronic assistant, etc.), and/or a smart accessory (e.g., a light bulb, a light switch, an electrical picture frame, etc.).

An agent device, e.g., any of 160-a, . . . , 160-b, may correspond one of different types of devices that may communicate with a user device and/or the user interaction engine 140. Each agent device, as described in greater detail below, may be viewed as an automated companion device that interfaces with a user with, e.g., the backbone support from the user interaction engine 140. An agent device as described herein may correspond to a robot which can be a game device, a toy device, a designated agent device such as a traveling agent or weather agent, etc. The agent device as disclosed herein is capable of facilitating and/or assisting in interactions with a user operating user device. In doing so, an agent device may be configured as a robot capable of controlling some of its parts, via the backend support from the application server 130, for, e.g., making certain physical movement (such as head), exhibiting certain facial expression (such as curved eyes for a smile), or saying things in a certain voice or tone (such as exciting tones) to display certain emotions.

When a user device (e.g., user device 110-a) is connected to an agent device, e.g., 160-a (e.g., via either a contact or contactless connection), a client running on a user device, e.g., 110-a, may communicate with the automated companion (either the agent device or the user interaction engine or both) to enable an interactive dialogue between the user operating the user device and the agent device. The client may act independently in some tasks or may be controlled remotely by the agent device or the user interaction engine 140. For example, to respond to a questions from a user, the agent device or the user interaction engine 140 may control the client running on the user device to render the speech of the response to the user. During a conversation, an agent device may include one or more input mechanisms (e.g., cameras, microphones, touch screens, buttons, etc.) that allow the agent device to capture inputs related to the user or the local environment associated with the conversation. Such inputs may assist the automated companion to develop an understanding of the atmosphere surrounding the conversation (e.g., movements of the user, sound of the environment) and the mindset of the human conversant (e.g., user picks up a ball which may indicates that the user is bored) in order to enable the automated companion to react accordingly and conduct the conversation in a manner that will keep the user interested and engaging.

In the illustrated embodiments, the user interaction engine 140 may be a backend server, which may be centralized or distributed. It is connected to the agent devices and/or user devices. It may be configured to provide backbone support to agent devices 160 and guide the agent devices to conduct conversations in a personalized and customized manner. In some embodiments, the user interaction engine 140 may receive information from connected devices (either agent devices or user devices), analyze such information, and control the flow of the conversations by sending instructions to agent devices and/or user devices. In some embodiments, the user interaction engine 140 may also communicate directly with user devices, e.g., providing dynamic data, e.g., control signals for a client running on a user device to render certain responses.

Generally speaking, the user interaction engine 140 may control the state and the flow of conversations between users and agent devices. The flow of each of the conversations may be controlled based on different types of information associated with the conversation, e.g., information about the user engaged in the conversation (e.g., from the user information database 130), the conversation history, surround information of the conversations, and/or the real time user feedbacks. In some embodiments, the user interaction engine 140 may be configured to obtain various sensory inputs such as, and without limitation, audio inputs, image inputs, haptic inputs, and/or contextual inputs, process these inputs, formulate an understanding of the human conversant, accordingly generate a response based on such understanding, and control the agent device and/or the user device to carry out the conversation based on the response. As an illustrative example, the user interaction engine 140 may receive audio data representing an utterance from a user operating user device, and generate a response (e.g., text) which may then be delivered to the user in the form of a computer generated utterance as a response to the user. As yet another example, the user interaction engine 140 may also, in response to the utterance, generate one or more instructions that control an agent device to perform a particular action or set of actions.

As illustrated, during a human machine dialogue, a user, as the human conversant in the dialogue, may communicate across the network 120 with an agent device or the user interaction engine 140. Such communication may involve data in multiple modalities such as audio, video, text, etc. Via a user device, a user can send data (e.g., a request, audio signal representing an utterance of the user, or a video of the scene surrounding the user) and/or receive data (e.g., text or audio response from an agent device). In some embodiments, user data in multiple modalities, upon being received by an agent device or the user interaction engine 140, may be analyzed to understand the human user's speech or gesture so that the user's emotion or intent may be estimated and used to determine a response to the user.

Figure 2A:
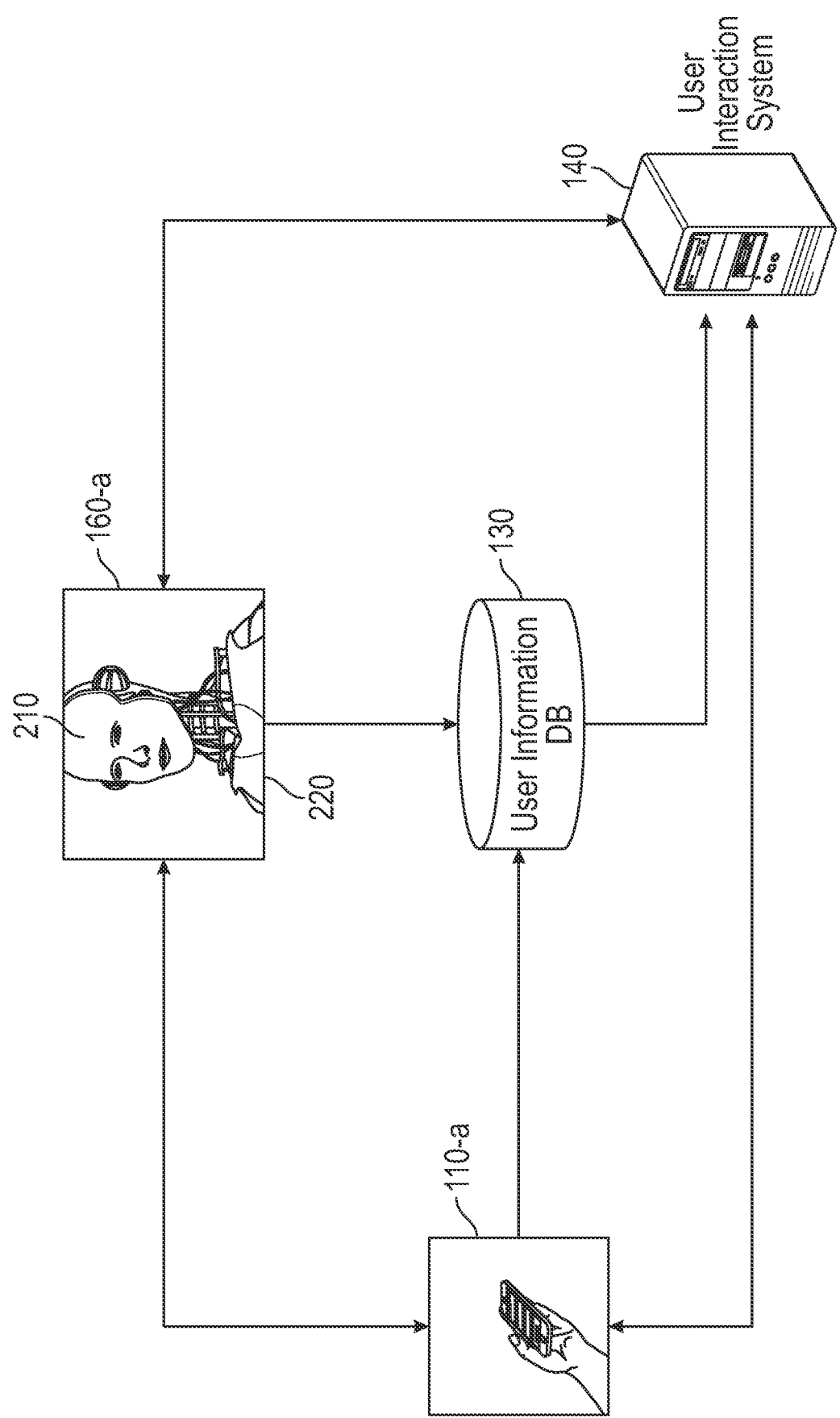
FIGS. 2A-2B depict connections among a user device, an agent device, and a user interaction engine during a dialogue, in accordance with an embodiment of the present teaching.

FIG. 2A depicts specific connections among a user device 110-a, an agent device 160-a, and the user interaction engine 140 during a dialogue, in accordance with an embodiment of the present teaching. As seen, connections between any two of the parties may all be bi-directional, as discussed herein. The agent device 160-a may interface with the user via the user device 110-a to conduct a dialogue in a bi-directional communications. On one hand, the agent device 160-a may be controlled by the user interaction engine 140 to utter a response to the user operating the user device 110-a. On the other hand, inputs from the user site, including, e.g., both the user's utterance or action as well as information about the surrounding of the user, are provided to the agent device via the connections. The agent device 160-a may be configured to process such input and dynamically adjust its response to the user. For example, the agent device may be instructed by the user interaction engine 140 to render a tree on the user device. Knowing that the surrounding environment of the user (based on visual information from the user device) shows green trees and lawns, the agent device may customize the tree to be rendered as a lush green tree. If the scene from the user site shows that it is a winter weather, the agent device may control to render the tree on the user device with parameters for a tree that has no leaves. As another example, if the agent device is instructed to render a duck on the user device, the agent device may retrieve information from the user information database 130 on color preference and generate parameters for customizing the duck in a user's preferred color before sending the instruction for the rendering to the user device.

In some embodiments, such inputs from the user's site and processing results thereof may also be transmitted to the user interaction engine 140 for facilitating the user interaction engine 140 to better understand the specific situation associated with the dialogue so that the user interaction engine 140 may determine the state of the dialogue, emotion/mindset of the user, and to generate a response that is based on the specific situation of the dialogue and the intended purpose of the dialogue (e.g., for teaching a child the English vocabulary). For example, if information received from the user device indicates that the user appears to be bored and become impatient, the user interaction engine 140 may determine to change the state of dialogue to a topic that is of interest of the user (e.g., based on the information from the user information database 130) in order to continue to engage the user in the conversation.

In some embodiments, a client running on the user device may be configured to be able to process raw inputs of different modalities acquired from the user site and send the processed information (e.g., relevant features of the raw inputs) to the agent device or the user interaction engine for further processing. This will reduce the amount of data transmitted over the network and enhance the communication efficiency. Similarly, in some embodiments, the agent device may also be configured to be able to process information from the user device and extract useful information for, e.g., customization purposes. Although the user interaction engine 140 may control the state and flow control of the dialogue, making the user interaction engine 140 light weight improves the user interaction engine 140 scale better.

Figure 2B:
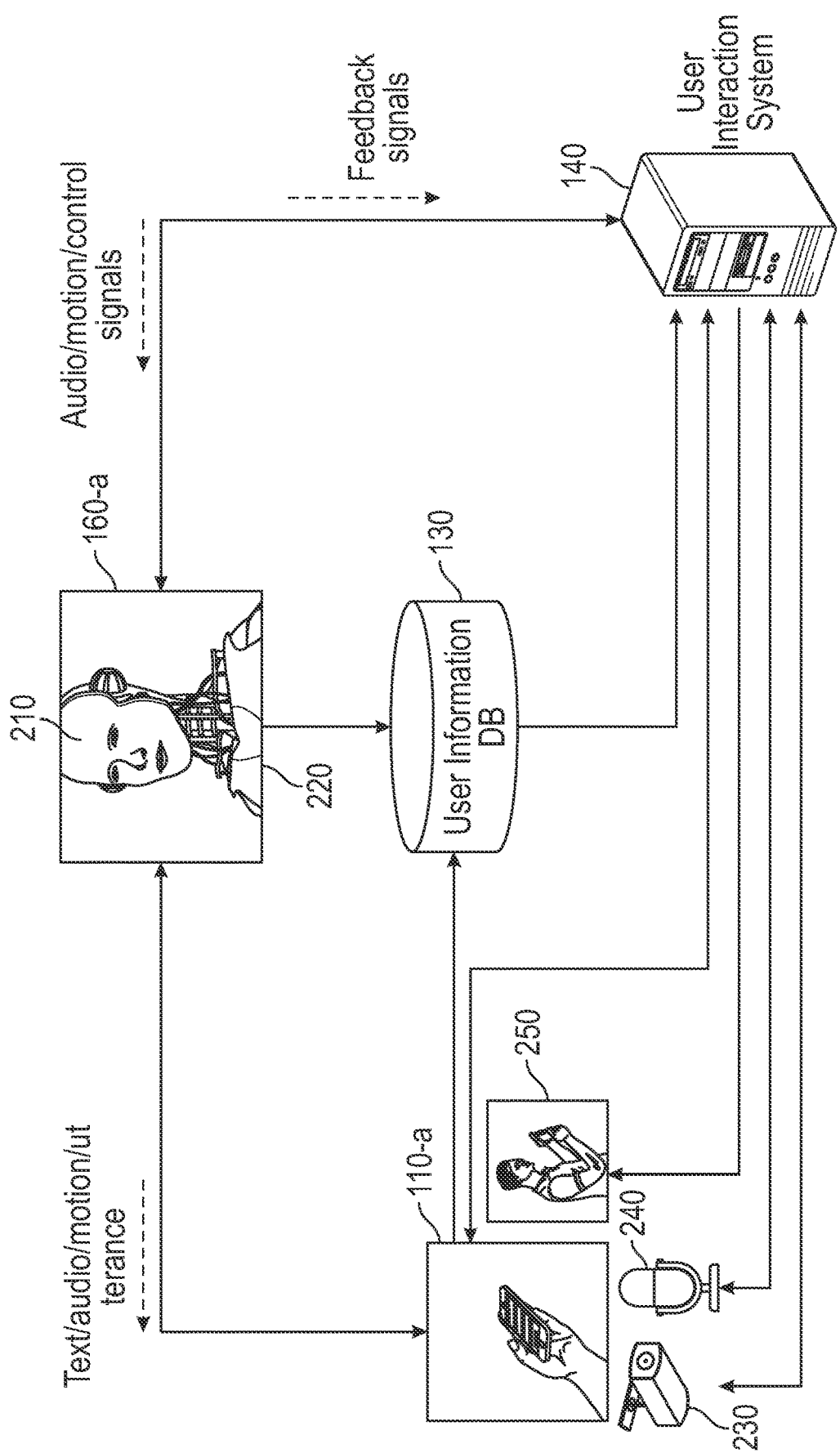

FIG. 2B depicts the same setting as what is presented in FIG. 2A with additional details on the user device 110-*a*. As shown, during a dialogue between the user and the agent 210, the user device 110-*a* may continually collect multi-modal sensor data related to the user and his/her surroundings, which may be analyzed to detect any information related to the dialogue and used to intelligently control the dialogue in an adaptive manner. This may further enhance the user experience or engagement. FIG. 2B illustrates exemplary sensors such as video sensor 230, audio sensor 240, . . . , or haptic sensor 250. The user device may also send textual data as part of the multi-model sensor data. Together, these sensors provide contextual information surrounding the dialogue and can be used for the user interaction engine 140 to understand the situation in order to manage the dialogue. In some embodiment, the multi-modal sensor data may first be processed on the user device and important features in different modalities may be extracted and sent to the user interaction engine 140 so that dialogue may be controlled with an understanding of the context. In some embodiments, the raw multi-modal sensor data may be sent directly to the user interaction engine 140 for processing.

Figure 3A:
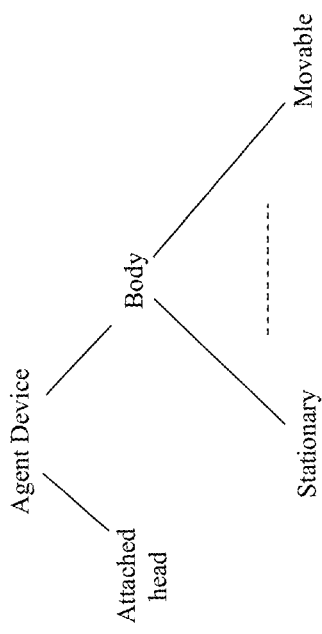
FIG. 3A illustrates an exemplary structure of an agent device with exemplary types of agent body, in accordance with an embodiment of the present teaching.

As seen in FIGS. 2A-2B, the agent device may correspond to a robot that has different parts, including its head 210 and its body 220. Although the agent device as illustrated in FIGS. 2A-2B appears to be a person robot, it may also be constructed in other forms as well, such as a duck, a bear, a rabbit, etc. FIG. 3A illustrates an exemplary structure of an agent device with exemplary types of agent body, in accordance with an embodiment of the present teaching. As presented, an agent device may include a head and a body with the head attached to the body. In some embodiments, the head of an agent device may have additional parts such as face, nose and mouth, some of which may be controlled to, e.g., make movement or expression. In some embodiments, the face on an agent device may correspond to a display screen on which a face can be rendered and the face may be of a person or of an animal. Such displayed face may also be controlled to express emotion.

The body part of an agent device may also correspond to different forms such as a duck, a bear, a rabbit, etc. The body of the agent device may be stationary, movable, or semi-movable. An agent device with stationary body may correspond to a device that can sit on a surface such as a table to conduct face to face conversation with a human user sitting next to the table. An agent device with movable body may correspond to a device that can move around on a surface such as table surface or floor. Such a movable body may include parts that can be kinematically controlled to make physical moves. For example, an agent body may include feet which can be controlled to move in space when needed. In some embodiments, the body of an agent device may be semi-movable, i.e., some parts are movable and some are not. For example, a tail on the body of an agent device with a duck appearance may be movable but the duck cannot move in space. A bear body agent device may also have arms that may be movable but the bear can only sit on a surface.

FIG. 3B illustrates an exemplary agent device or automated companion 160-*a*, in accordance with an embodiment of the present teaching. The automated companion 160-*a* is a device that interacts with people using speech and/or facial expression or physical gestures. For example, the automated companion 160-*a* corresponds to an animatronic peripheral device with different parts, including head portion 310, eye portion (cameras) 320, a mouth portion with laser 325 and a microphone 330, a speaker 340, neck portion with servos 350, one or more magnet or other components that can be used for contactless detection of presence 360, and a body portion corresponding to, e.g., a charge base 370. In operation, the automated companion 160-*a* may be connected to a user device which may include a mobile multi-function device (110-*a*) via network connections. Once connected, the automated companion 160-*a* and the user device interact with each other via, e.g., speech, motion, gestures, and/or via pointing with a laser pointer.

Other exemplary functionalities of the automated companion 160-*a* may include reactive expressions in response to a user's response via, e.g., an interactive video cartoon character (e.g., avatar) displayed on, e.g., a screen as part of a face on the automated companion. The automated companion may use a camera (320) to observe the user's presence, facial expressions, direction of gaze, surroundings, etc. An animatronic embodiment may "look" by pointing its head (310) containing a camera (320), "listen" using its microphone (340), "point" by directing its head (310) that can move via servos (350). In some embodiments, the head of the agent device may also be controlled remotely by a, e.g., the user interaction engine 140 or by a client in a user device (110-*a*), via a laser (325). The exemplary automated companion 160-*a* as shown in FIG. 3B may also be controlled to "speak" via a speaker (330).

Figure 4A:
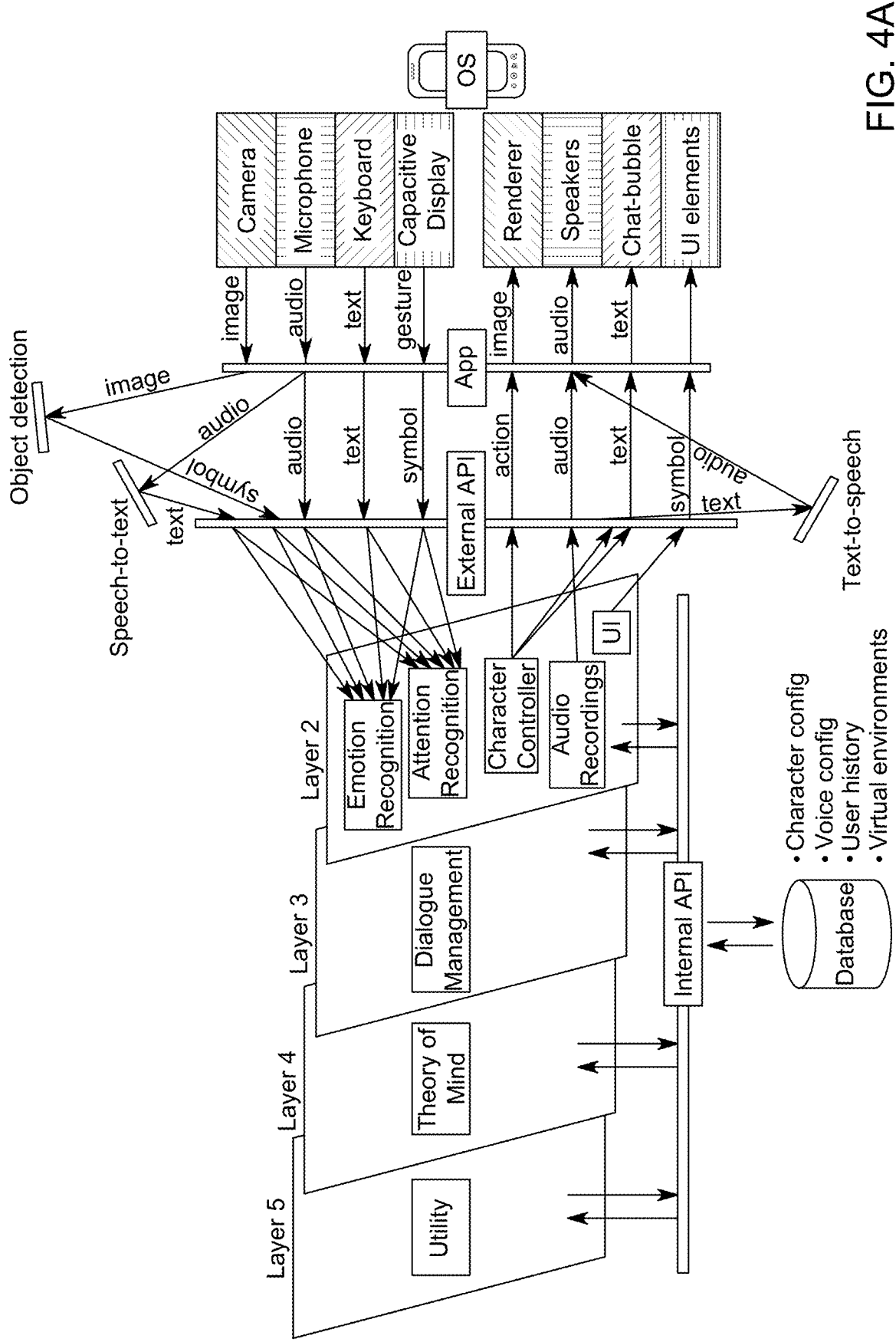
FIG. 4A depicts an exemplary high level system diagram for an overall system for the automated companion, according to various embodiments of the present teaching.

FIG. 4A depicts an exemplary high level system diagram for an overall system for the automated companion, according to various embodiments of the present teaching. In this illustrated embodiment, the overall system may encompass components/function modules residing in a user device, an agent device, and the user interaction engine 140. The overall system as depicted herein comprises a plurality of layers of processing and hierarchies that together carries out human-machine interactions in an intelligent manner. In the illustrated embodiment, there are 5 layers, including layer 1 for front end application as well as front end multi-modal data processing, layer 2 for characterizations of the dialog setting, layer 3 is where the dialog management module resides, layer 4 for estimated mindset of different parties (human, agent, device, etc.), layer 5 for so called utility. Different layers may correspond different levels of processing, ranging from raw data acquisition and processing at layer 1 to layer 5 on processing changing utilities of participants of dialogues.

The term "utility" is hereby defined as preferences of a party identified based on states detected associated with dialogue histories. Utility may be associated with a party in a dialogue, whether the party is a human, the automated companion, or other intelligent devices. A utility for a particular party may represent different states of a world, whether physical, virtual, or even mental. For example, a state may be represented as a particular path along which a dialog walks through in a complex map of the world. At different instances, a current state evolves into a next state based on the interaction between multiple parties. States may also be party dependent, i.e., when different parties participate in an interaction, the states arising from such interaction may vary. A utility associated with a party may be organized as a hierarchy of preferences and such a hierarchy of preferences may evolve over time based on the party's choices made and likings exhibited during conversations. Such preferences, which may be represented as an ordered sequence of choices made out of different options, is what is referred to as utility. The present teaching discloses method and system by which an intelligent automated companion is capable of learning, through a dialogue with a human conversant, the user's utility.

Within the overall system for supporting the automated companion, front end applications as well as front end multi-modal data processing in layer 1 may reside in a user device and/or an agent device. For example, the camera, microphone, keyboard, display, renderer, speakers, chat-bubble, and user interface elements may be components or functional modules of the user device. For instance, there may be an application or client running on the user device which may include the functionalities before an external application interface (API) as shown in FIG. 4A. In some embodiments, the functionalities beyond the external API may be considered as the backend system or reside in the user interaction engine 140. The application running on the user device may take multi-model data (audio, images, video, text) from the sensors or circuitry of the user device, process the multi-modal data to generate text or other types of signals (object such as detected user face, speech understanding result) representing features of the raw multi-modal data, and send to layer 2 of the system.

In layer 1, multi-modal data may be acquired via sensors such as camera, microphone, keyboard, display, speakers, chat bubble, renderer, or other user interface elements. Such multi-modal data may be analyzed to estimated or infer various features that may be used to infer higher level characteristics such as expression, characters, gesture, emotion, action, attention, intent, etc. Such higher level characteristics may be obtained by processing units at layer 2 and the used by components of higher layers, via the internal API as shown in FIG. 4A, to e.g., intelligently infer or estimate additional information related to the dialogue at higher conceptual levels. For example, the estimated emotion, attention, or other characteristics of a participant of a dialogue obtained at layer 2 may be used to estimate the mindset of the participant. In some embodiments, such mindset may also be estimated at layer 4 based on additional information, e.g., recorded surrounding environment or other auxiliary information in such surrounding environment such as sound.

The estimated mindsets of parties, whether related to humans or the automated companion (machine), may be relied on by the dialogue management at layer 3, to determine, e.g., how to carry on a conversation with a human conversant. How each dialogue progresses often represent a human user's preferences. Such preferences may be captured dynamically during the dialogue at utilities (layer 5). As shown in FIG. 4A, utilities at layer 5 represent evolving states that are indicative of parties' evolving preferences, which can also be used by the dialogue management at layer 3 to decide the appropriate or intelligent way to carry on the interaction.

Sharing of information among different layers may be accomplished via APIs. In some embodiments as illustrated in FIG. 4A, information sharing between layer 1 and rest of the layers is via an external API while sharing information among layers 2-5 is via an internal API. It is understood that this merely a design choice and other implementations are also possible to realize the present teaching presented herein. In some embodiments, through the internal API, various layers (2-5) may access information created by or stored at other layers to support the processing. Such information may include common configuration to be applied to a dialogue (e.g., character of the agent device is an avatar, voice preferred, or a virtual environment to be created for the dialogue, etc.), a current state of the dialogue, a current dialogue history, known user preferences, estimated user intent/emotion/mindset, etc. In some embodiments, some information that may be shared via the internal API may be accessed from an external database. For example, certain configurations related to a desired character for the agent device (a duck) may be accessed from, e.g., an open source database, that provide parameters (e.g., parameters to visually render the duck and/or parameters needed to render the speech from the duck).

Figure 4B:
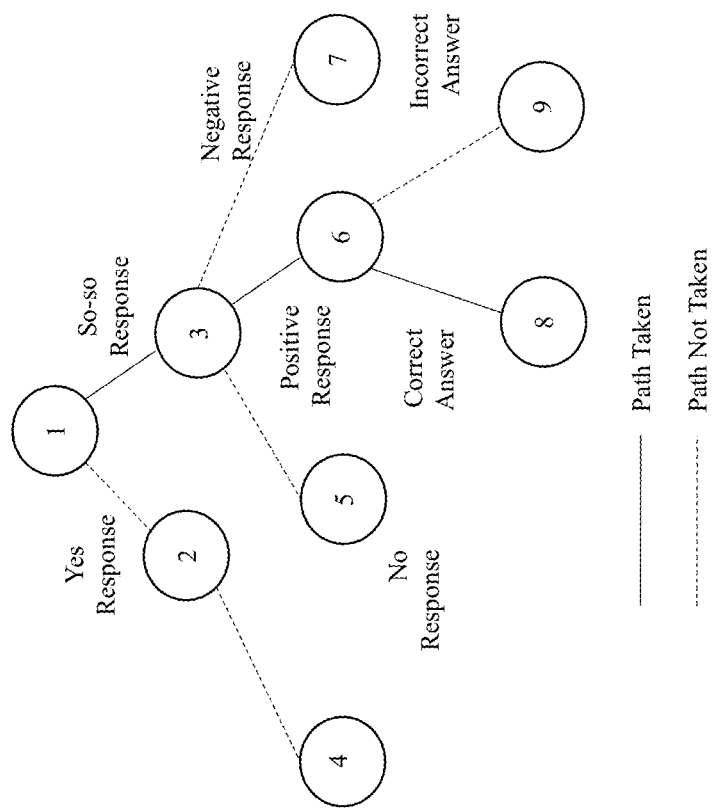
FIG. 4B illustrates a part of a dialogue tree of an on-going dialogue with paths taken based on interactions between the automated companion and a user, according to an embodiment of the present teaching.

FIG. 4B illustrates a part of a dialogue tree of an on-going dialogue with paths taken based on interactions between the automated companion and a user, according to an embodiment of the present teaching. In this illustrated example, the dialogue management at layer 3 (of the automated companion) may predict multiple paths with which a dialogue, or more generally an interaction, with a user may proceed. In this example, each node may represent a point of the current state of the dialogue and each branch from a node may represent possible responses from a user. As shown in this example, at node 1, the automated companion may face with three separate paths which may be taken depending on a response detected from a user. If the user responds with an affirmative response, dialogue tree 400 may proceed from node 1 to node 2. At node 2, a response may be generated for the automated companion in response to the affirmative response from the user and may then be rendered to the user, which may include audio, visual, textual, haptic, or any combination thereof.

If, at node 1, the user responses negatively, the path is for this stage is from node 1 to node 10. If the user responds, at node 1, with a "so-so" response (e.g., not negative but also not positive), dialogue tree 400 may proceed to node 3, at which a response from the automated companion may be rendered and there may be three separate possible responses from the user, "No response," "Positive Response," and "Negative response," corresponding to nodes 5, 6, and 7, respectively. Depending on the user's actual response with respect to the automated companion's response rendered at node 3, the dialogue management at layer 3 may then follow the dialogue accordingly. For instance, if the user responds at node 3 with a positive response, the automated companion moves to respond to the user at node 6. Similarly, depending on the user's reaction to the automated companion's response at node 6, the user may further respond with an answer that is correct. In this case, the dialogue state moves from node 6 to node 8, etc. In this illustrated example, the dialogue state during this period moved from node 1, to node 3, to node 6, and to node 8. The traverse through nodes 1, 3, 6, and 8 forms a path consistent with the underlying conversation between the automated companion and a user. As seen in FIG. 4B, the path representing the dialogue is represented by the solid lines connecting nodes 1, 3, 6, and 8, whereas the paths skipped during a dialogue is represented by the dashed lines.

FIG. 4C illustrates exemplary a human-agent device interaction and exemplary processing performed by the automated companion, according to an embodiment of the present teaching. As seen from FIG. 4C, operations at different layers may be conducted and together they facilitate intelligent dialogue in a cooperated manner. In the illustrated example, an agent device may first ask a user "How are you doing today?" at 402 to initiate a conversation. In response to utterance at 402, the user may respond with utterance "Ok" at 404. To manage the dialogue, the automated companion may activate different sensors during the dialogue to make observation of the user and the surrounding environment. For example, the agent device may acquire multi-modal data about the surrounding environment where the user is in. Such multi-modal data may include audio, visual, or text data. For example, visual data may capture the facial expression of the user. The visual data may also reveal contextual information surrounding the scene of the conversation. For instance, a picture of the scene may reveal that there is a basketball, a table, and a chair, which provides information about the environment and may be leveraged in dialogue management to enhance engagement of the user. Audio data may capture not only the speech response of the user but also other peripheral information such as the tone of the response, the manner by which the user utters the response, or the accent of the user.

Based on acquired multi-modal data, analysis may be performed by the automated companion (e.g., by the front end user device or by the backend user interaction engine 140) to assess the attitude, emotion, mindset, and utility of the users. For example, based on visual data analysis, the automated companion may detect that the user appears sad, not smiling, the user's speech is slow with a low voice. The characterization of the user's states in the dialogue may be performed at layer 2 based on multi-model data acquired at layer 1. Based on such detected observations, the automated companion may infer (at 406) that the user is not that interested in the current topic and not that engaged. Such inference of emotion or mental state of the user may, for instance, be performed at layer 4 based on characterization of the multi-modal data associated with the user.

To respond to the user's current state (not engaged), the automated companion may determine to perk up the user in order to better engage the user. In this illustrated example, the automated companion may leverage what is available in the conversation environment by uttering a question to the user at 408: "Would you like to play a game?" Such a question may be delivered in an audio form as speech by converting text to speech, e.g., using customized voices individualized for the user. In this case, the user may respond by uttering, at 410, "Ok." Based on the continuously acquired multi-model data related to the user, it may be observed, e.g., via processing at layer 2, that in response to the invitation to play a game, the user's eyes appear to be wandering, and in particular that the user's eyes may gaze towards where the basketball is located. At the same time, the automated companion may also observe that, once hearing the suggestion to play a game, the user's facial expression changes from "sad" to "smiling." Based on such observed characteristics of the user, the automated companion may infer, at 412, that the user is interested in basketball.

Based on the acquired new information and the inference based on that, the automated companion may decide to leverage the basketball available in the environment to make the dialogue more engaging for the user yet still achieving the educational goal for the user. In this case, the dialogue management at layer 3 may adapt the conversion to talk about a game and leverage the observation that the user gazed at the basketball in the room to make the dialogue more interesting to the user yet still achieving the goal of, e.g., educating the user. In one example embodiment, the automated companion generates a response, suggesting the user to play a spelling game" (at 414) and asking the user to spell the word "basketball."

Given the adaptive dialogue strategy of the automated companion in light of the observations of the user and the environment, the user may respond providing the spelling of word "basketball." (at 416). Observations are continuously made as to how enthusiastic the user is in answering the spelling question. If the user appears to respond quickly with a brighter attitude, determined based on, e.g., multi-modal data acquired when the user is answering the spelling question, the automated companion may infer, at 418, that the user is now more engaged. To further encourage the user to actively participate in the dialogue, the automated companion may then generate a positive response "Great job!" with instruction to deliver this response in a bright, encouraging, and positive voice to the user.

Figure 5:
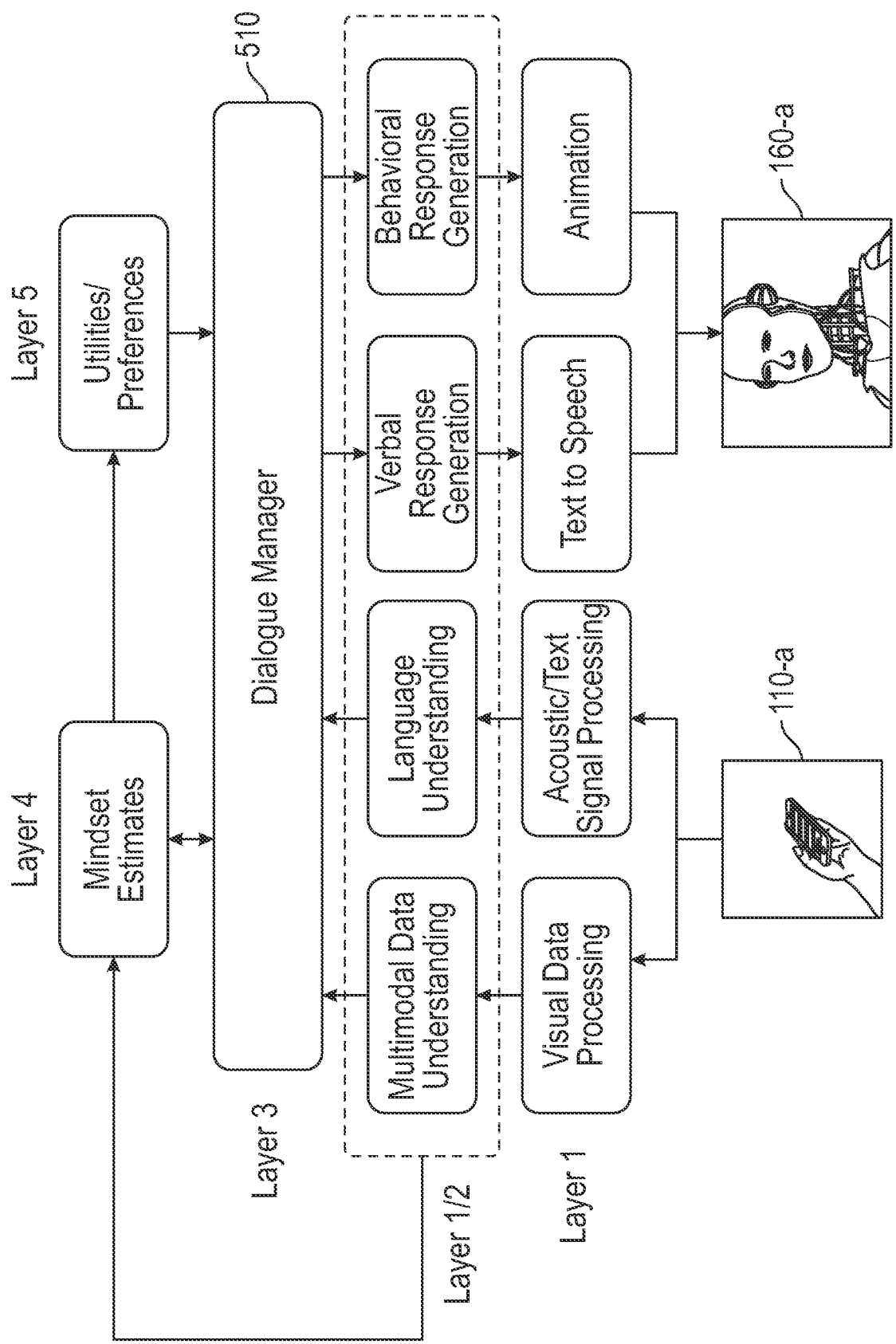
FIG. 5 illustrates exemplary multiple layer processing and communications among different processing layers of an automated dialogue companion, according to an embodiment of the present teaching.

FIG. 5 illustrates exemplary communications among different processing layers of an automated dialogue companion centered around a dialogue manager 510, according to various embodiments of the present teaching. The dialogue manager 510 in FIG. 5 corresponds to a functional component of the dialogue management at layer 3. A dialog manager is an important part of the automated companion and it manages dialogues. Traditionally, a dialogue manager takes in as input a user's utterances and determine how to respond to the user. This is performed without taking into account the user's preferences, user's mindset/emotions/intent, or surrounding environment of the dialogue, i.e., given any weights to the different available states of the relevant world. The lack of an understanding of the surrounding world often limits the perceived authenticity of or engagement in the conversations between a human user and an intelligent agents.

In some embodiments of the present teaching, the utility of parties of a conversation relevant to an on-going dialogue is exploited to allow a more personalized, flexible, and engaging conversion to be carried out. It facilitates an intelligent agent acting in different roles to become more effective in different tasks, e.g., scheduling appointments, booking travel, ordering equipment and supplies, and researching online on various topics. When an intelligent agent is aware of a user's dynamic mindset, emotions, intent, and/or utility, it enables the agent to engage a human conversant in the dialogue in a more targeted and effective way. For example, when an education agent teaches a child, the preferences of the child (e.g., color he loves), the emotion observed (e.g., sometimes the child does not feel like continue the lesson), the intent (e.g., the child is reaching out to a ball on the floor instead of focusing on the lesson) may all permit the education agent to flexibly adjust the focus subject to toys and possibly the manner by which to continue the conversation with the child so that the child may be given a break in order to achieve the overall goal of educating the child.

As another example, the present teaching may be used to enhance a customer service agent in its service by asking questions that are more appropriate given what is observed in real-time from the user and hence achieving improved user experience. This is rooted in the essential aspects of the present teaching as disclosed herein by developing the means and methods to learn and adapt preferences or mindsets of parties participating in a dialogue so that the dialogue can be conducted in a more engaging manner.

Dialogue manager (DM) 510 is a core component of the automated companion. As shown in FIG. 5, DM 510 (layer 3) takes input from different layers, including input from layer 2 as well as input from higher levels of abstraction such as layer 4 for estimating mindsets of parties involved in a dialogue and layer 5 that learns utilities/preferences based on dialogues and assessed performances thereof. As illustrated, at layer 1, multi-modal information is acquired from sensors in different modalities which is processed to, e.g., obtain features that characterize the data. This may include signal processing in visual, acoustic, and textual modalities.

Such multi-modal information may be acquired by sensors deployed on a user device, e.g., 110-*a* during the dialogue. The acquired multi-modal information may be related to the user operating the user device 110-*a* and/or the surrounding of the dialogue scene. In some embodiments, the multi-model information may also be acquired by an agent device, e.g., 160-*a*, during the dialogue. In some embodiments, sensors on both the user device and the agent device may acquire relevant information. In some embodiments, the acquired multi-model information is processed at Layer 1, as shown in FIG. 5, which may include both a user device and an agent device. Depending on the situation and configuration, Layer 1 processing on each device may differ. For instance, if a user device 110-*a* is used to acquire surround information of a dialogue, including both information about the user and the environment around the user, raw input data (e.g., text, visual, or audio) may be processed on the user device and then the processed features may then be sent to Layer 2 for further analysis (at a higher level of abstraction). If some of the multi-modal information about the user and the dialogue environment is acquired by an agent device, the processing of such acquired raw data may also be processed by the agent device (not shown in FIG. 5) and then features extracted from such raw data may then be sent from the agent device to Layer 2 (which may be located in the user interaction engine 140).

Layer 1 also handles information rendering of a response from the automated dialogue companion to a user. In some embodiments, the rendering is performed by an agent device, e.g., 160-*a* and examples of such rendering include speech, expression which may be facial or physical acts performed. For instance, an agent device may render a text string received from the user interaction engine 140 (as a response to the user) to speech so that the agent device may utter the response to the user. In some embodiments, the text string may be sent to the agent device with additional rendering instructions such as volume, tone, pitch, etc. which may be used to convert the text string into a sound wave corresponding to an utterance of the content in a certain manner. In some embodiments, a response to be delivered to a user may also include animation, e.g., utter a response with an attitude which may be delivered via, e.g., a facial expression or a physical act such as raising one arm, etc. In some embodiments, the agent may be implemented as an application on a user device. In this situation, rendering of a response from the automated dialogue companion is implemented via the user device, e.g., 110-*a* (not shown in FIG. 5).

Processed features of the multi-modal data may be further processed at layer 2 to achieve language understanding and/or multi-modal data understanding including visual, textual, and any combination thereof. Some of such understanding may be directed to a single modality, such as speech understanding, and some may be directed to an understanding of the surrounding of the user engaging in a dialogue based on integrated information. Such understanding may be physical (e.g., recognize certain objects in the scene), perceivable (e.g., recognize what the user said, or certain significant sound, etc.), or mental (e.g., certain emotion such as stress of the user estimated based on, e.g., the tune of the speech, a facial expression, or a gesture of the user).

The multimodal data understanding generated at layer 2 may be used by DM 510 to determine how to respond. To enhance engagement and user experience, the DM 510 may also determine a response based on the estimated mindsets of the user and of the agent from layer 4 as well as the utilities of the user engaged in the dialogue from layer 5. The mindsets of the parties involved in a dialogue may be estimated based on information from Layer 2 (e.g., estimated emotion of a user) and the progress of the dialogue. In some embodiments, the mindsets of a user and of an agent may be estimated dynamically during the course of a dialogue and such estimated mindsets may then be used to learn, together with other data, utilities of users. The learned utilities represent preferences of users in different dialogue scenarios and are estimated based on historic dialogues and the outcomes thereof.

In each dialogue of a certain topic, the dialogue manager 510 bases its control of the dialogue on relevant dialogue tree(s) that may or may not be associated with the topic (e.g., may inject small talks to enhance engagement). To generate a response to a user in a dialogue, the dialogue manager 510 may also consider additional information such as a state of the user, the surrounding of the dialogue scene, the emotion of the user, the estimated mindsets of the user and the agent, and the known preferences of the user (utilities).

An output of DM 510 corresponds to an accordingly determined response to the user. To deliver a response to the user, the DM 510 may also formulate a way that the response is to be delivered. The form in which the response is to be delivered may be determined based on information from multiple sources, e.g., the user's emotion (e.g., if the user is a child who is not happy, the response may be rendered in a gentle voice), the user's utility (e.g., the user may prefer speech in certain accent similar to his parents'), or the surrounding environment that the user is in (e.g., noisy place so that the response needs to be delivered in a high volume). DM 510 may output the response determined together with such delivery parameters.

In some embodiments, the delivery of such determined response is achieved by generating the deliverable form(s) of each response in accordance with various parameters associated with the response. In a general case, a response is delivered in the form of speech in some natural language. A response may also be delivered in speech coupled with a particular nonverbal expression as a part of the delivered response, such as a nod, a shake of the head, a blink of the eyes, or a shrug. There may be other forms of deliverable form of a response that is acoustic but not verbal, e.g., a whistle.

To deliver a response, a deliverable form of the response may be generated via, e.g., verbal response generation and/or behavior response generation, as depicted in FIG. 5. Such a responses in its determined deliverable form(s) may then be used by a renderer to actual render the response in its intended form(s). For a deliverable form in a natural language, the text of the response may be used to synthesize a speech signal via, e.g., text to speech techniques, in accordance with the delivery parameters (e.g., volume, accent, style, etc.). For any response or part thereof, that is to be delivered in a non-verbal form(s), e.g., with a certain expression, the intended non-verbal expression may be translated into, e.g., via animation, control signals that can be used to control certain parts of the agent device (physical representation of the automated companion) to perform certain mechanical movement to deliver the non-verbal expression of the response, e.g., nodding head, shrug shoulders, or whistle. In some embodiments, to deliver a response, certain software components may be invoked to render a different facial expression of the agent device. Such rendition(s) of the response may also be simultaneously carried out by the agent (e.g., speak a response with a joking voice and with a big smile on the face of the agent).

Figure 6:
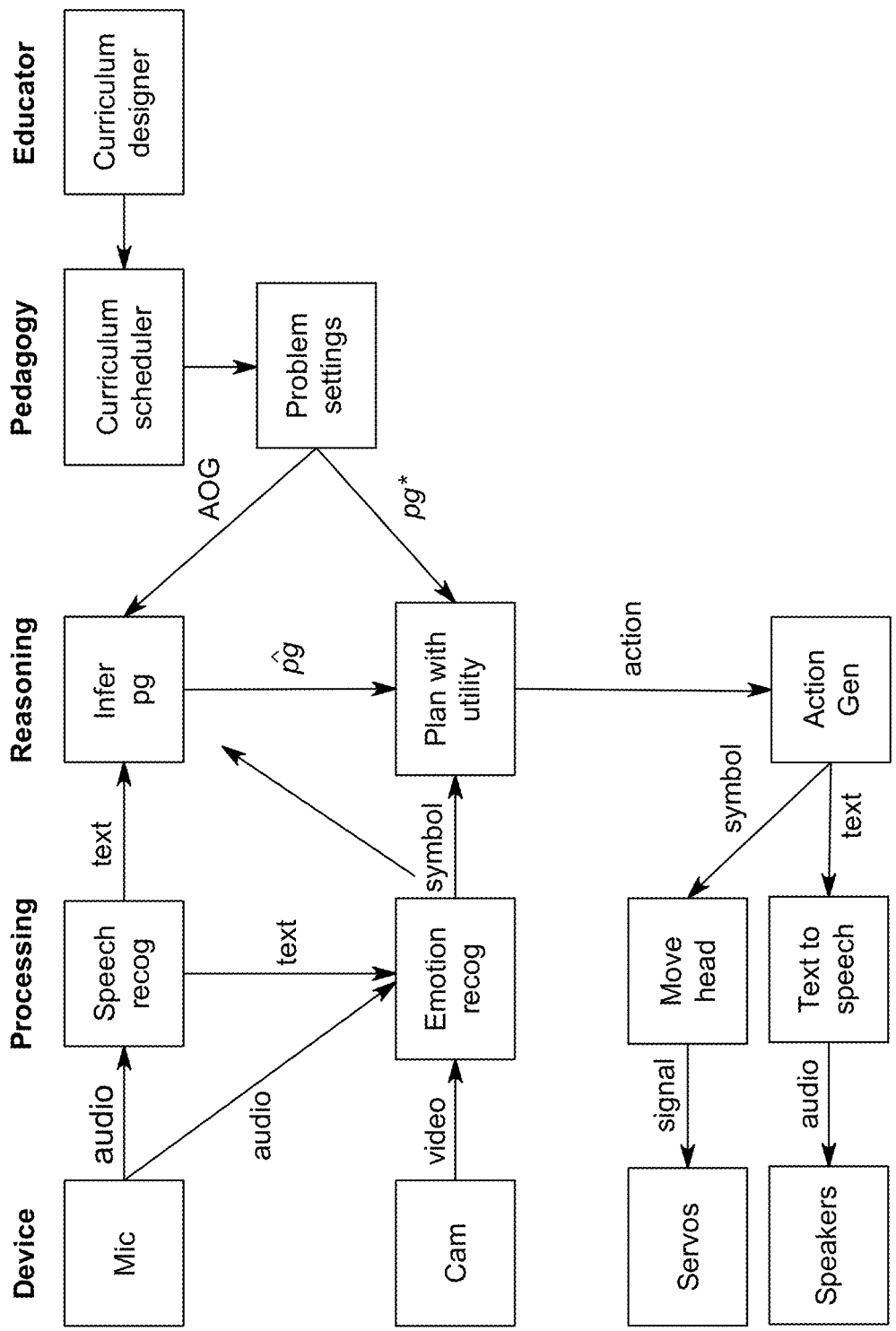
FIG. 6 depicts an exemplary high level system framework for an artificial intelligence based educational companion, according to an embodiment of the present teaching.

FIG. 6 depicts an exemplary high level system diagram for an artificial intelligence based educational companion, according to various embodiments of the present teaching. In this illustrated embodiment, there are five levels of processing, namely device level, processing level, reasoning level, pedagogy or teaching level, and educator level. The device level comprising sensors such as microphone and camera or media delivery devices such as servos to move, e.g., body parts of a robot or speakers to deliver dialogue content. The processing level comprises various processing components directed to processing of different types of signals, which include both input and output signals.

On the input side, the processing level may include speech processing module for performing, e.g., speech recognition based on audio signal obtained from an audio sensor (microphone) to understand what is being uttered in order to determine how to respond. The audio signal may also be recognized to generate text information for further analysis. The audio signal from the audio sensor may also be used by an emotion recognition processing module. The emotion recognition module may be designed to recognize various emotions of a party based on both visual information from a camera and the synchronized audio information. For instance, a happy emotion may often be accompanied with a smile face and a certain acoustic cues. The text information obtained via speech recognition may also be used by the emotion recognition module, as a part of the indication of the emotion, to estimate the emotion involved.

On the output side of the processing level, when a certain response strategy is determined, such strategy may be translated into specific actions to take by the automated companion to respond to the other party. Such action may be carried out by either deliver some audio response or express certain emotion or attitude via certain gesture. When the response is to be delivered in audio, text with words that need to be spoken are processed by a text to speech module to produce audio signals and such audio signals are then sent to the speakers to render the speech as a response. In some embodiments, the speech generated based on text may be performed in accordance with other parameters, e.g., that may be used to control to generate the speech with certain tones or voices. If the response is to be delivered as a physical action, such as a body movement realized on the automated companion, the actions to be taken may also be instructions to be used to generate such body movement. For example, the processing level may include a module for moving the head (e.g., nodding, shaking, or other movement of the head) of the automated companion in accordance with some instruction (symbol). To follow the instruction to move the head, the module for moving the head may generate electrical signal, based on the instruction, and send to servos to physically control the head movement.

The third level is the reasoning level, which is used to perform high level reasoning based on analyzed sensor data. Text from speech recognition, or estimated emotion (or other characterization) may be sent to an inference program which may operate to infer various high level concepts such as intent, mindset, preferences based on information received from the second level. The inferred high level concepts may then be used by a utility based planning module that devises a plan to respond in a dialogue given the teaching plans defined at the pedagogy level and the current state of the user. The planned response may then be translated into an action to be performed to deliver the planned response. The action is then further processed by an action generator to specifically direct to different media platform to carry out the intelligent response.

The pedagogy and educator levels both related to the educational application as disclosed. The educator level includes activities related to designing curriculums for different subject matters. Based on designed curriculum, the pedagogy level includes a curriculum scheduler that schedules courses based on the designed curriculum and based on the curriculum schedule, the problem settings module may arrange certain problems settings be offered based on the specific curriculum schedule. Such problem settings may be used by the modules at the reasoning level to assist to infer the reactions of the users and then plan the response accordingly based on utility and inferred state of mind.

Figure 7:
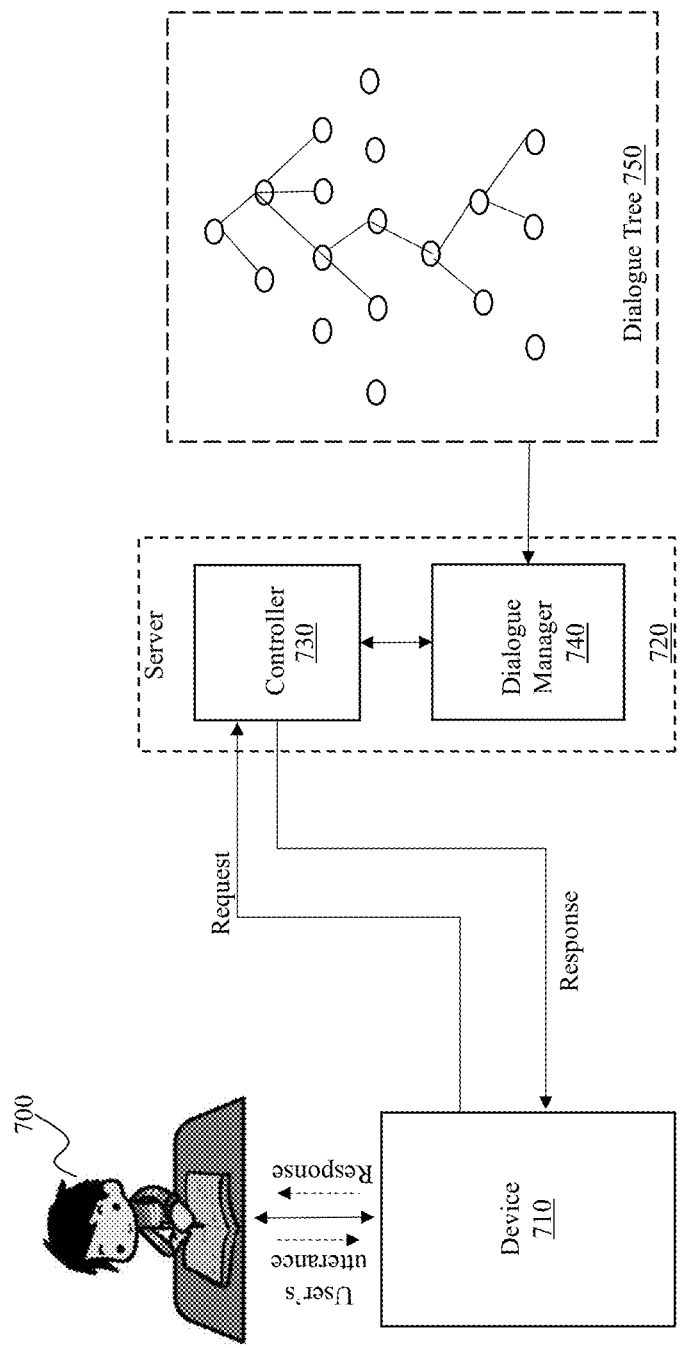
FIG. 7 illustrates a device-server configuration of a human machine dialogue system.

In a user machine dialogue system, the dialogue manager such as 510 in FIG. 5 plays a central role. It receives input from a user device or an agent device with observations (of the user's utterance, facial expression, surroundings, etc.) and determines a response that is appropriate given the current state of the dialogue and the objective(s) of the dialogue. For instance, if an objective of a particular dialogue is to teach the concept of triangulation to the user, a response devised by the dialogue manager 510 is determined not only based on a previous communication from the user but also the objective of ensuring that the user learns the concept. Traditionally, a dialogue system drives communication with a human user by exploring a dialogue tree associated with the intended purpose of the dialogue and a current state of the conversation. This is illustrated in FIG. 7, where a user 700 interfacing with a device 710 to carry out a conversation. During the conversation, user utters some speech that is sent to the device 710 and based on the utterance of the user, the device sends a request to a server 720, which then provides a response (obtained based on a dialogue tree 750) to the device, which then renders the response to the user. Due to limited computation power and memory, most of the computation needed to generate a response to the user is performed at server 720.

In operation, from the perspective of the device 710, it acquires utterance from the user 700 related to the dialogue, transmits a request with the acquired user's information to the server 720, subsequently receives a response determined by the server 720, and renders the response on the device 710 to user 700. On the server side, it comprises a controller 730 which may be deployed to interface with the device 110-a and a dialogue manager 740 that drives the dialogue with a user based on an appropriate dialogue tree 750. The dialogue tree 750 may be selected from a plurality of dialogue trees based on the current dialogue. For instance, if a current dialogue is for booking a flight, the dialogue tree selected for the dialogue manager 740 to drive the conversation may be specifically constructed for that intended purpose.

When user's information is received, the controller 730 may analyze the received user's information, such as what the user uttered, to derive a current state of the dialogue. It may then invoke the dialogue manager 740 to searches in the dialogue tree 750 based on the current state of the dialogue to identify an appropriate response to the user. Such an identified response is then sent from the dialogue manager 740 to the controller 730 which may then forward to the device 710. Such a dialogue process requires back and forth communication traffic between the device 710 and the server 720, costing time and bandwidth. In addition, in most situations the server 720 may be the backbone support to multiple user devices and/or agent devices (if they are separate from the user devices). Furthermore, each of the user device may be in a different dialogue that needs to be driven using a different dialogue tree. Given that, when there is a high number of devices relying on the server 720 to drive their respective dialogues, as the traditionally the server 720 needs to make decisions for all user devices/agent devices, the constant processing of information from different dialogues and searching of different dialogue trees for deriving responses for different dialogues may become time consuming, affecting the server's ability to scale up.

The present teaching discloses an alternative configuration to enable a distributed way of conducting a user machine dialogue by intelligently caching relevant segments of a full dialogue tree 750 on devices (either a user device or an agent device). The "relevancy" here may be defined dynamically based on the respective temporal and spatial locality related to each dialogue at different time frames. To facilitate the utilization of a local dialogue tree cashed on a device, the cashed dialogue tree may be provided in conjunction with a local version of a dialogue manager with an appropriate set of functions enabling the local dialogue manager to operate on the cached dialogue tree. With respect to each local dialogue tree to be cashed on a device, a sub-set of the functions associated with the parent dialogue tree (the overall dialogue tree from which the local dialogue tree is carved out) may be determined and provided dynamically. For example, the functions that enables the local dialogue manager to parse the cached local dialogue tree and to traverse the local dialogue tree. In some embodiments, the local dialogue manager to be deployed on a device may be optimized based on different criteria, e.g., the local device type, the specific local dialogue tree, the nature of the dialogue, the observations made from the dialogue scene, and/or certain user preferences.

Figure 8:
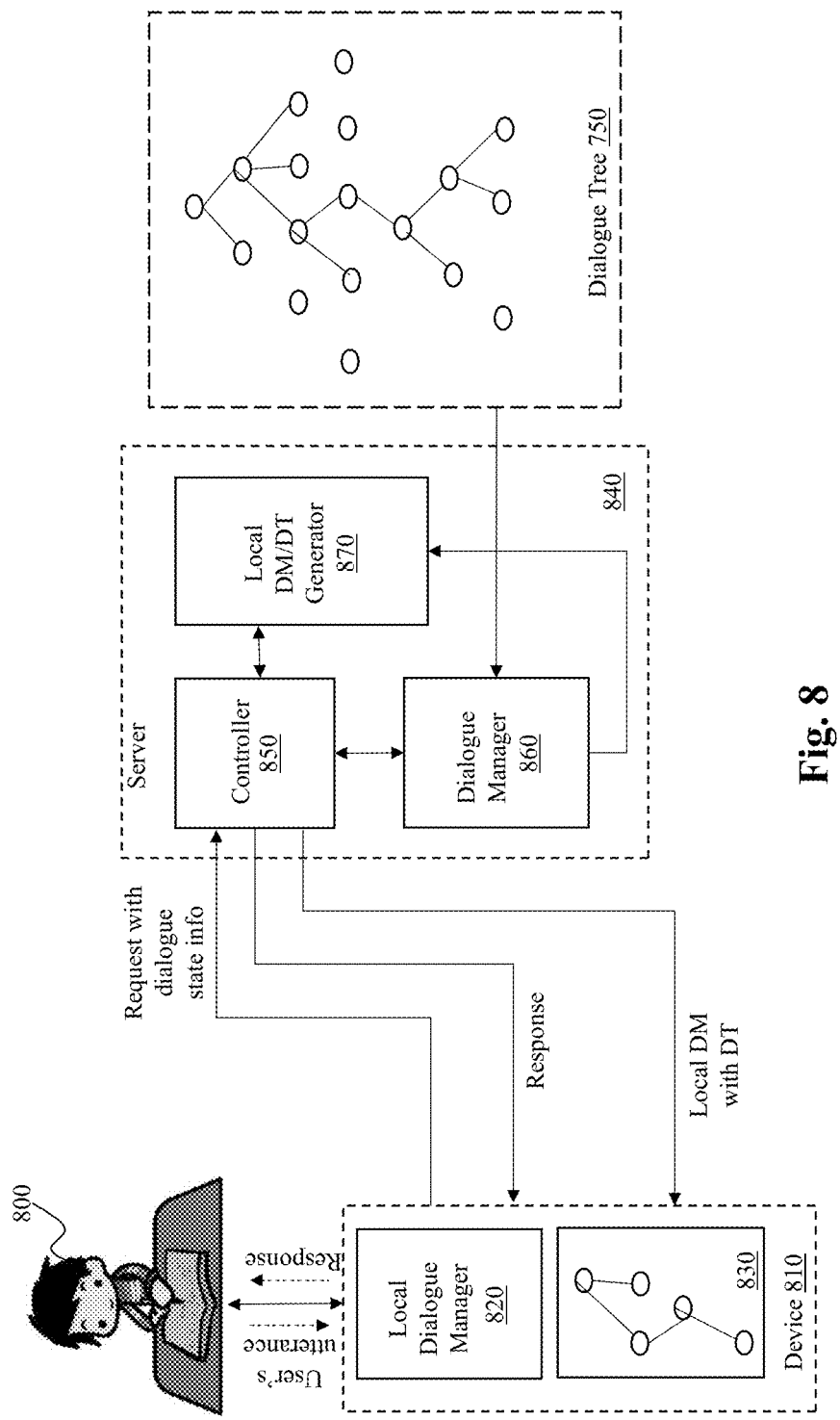
FIG. 8 depicts an exemplary framework directed to human machine dialogue management, according to an embodiment of the present teaching.

FIG. 8 depicts an exemplary framework directed to distributed dialogue management, according to an embodiment of the present teaching. As shown, the framework includes a device 810 interfacing with a user 800 and a server 840 and the device and the server together drives a dialogue with the user 800 in a distributed manner. Depending on the actual dialogue configuration, the device 710 may be a user device, e.g., 110-a, operated by user 700, or an agent device, e.g., 160-a, that is part of an automated dialogue companion, or a combination thereof. The device is used to interface with user 700 or a user device 110-a to carry on a dialogue with the user. The device and the server together constitute an automated dialogue companion and manages the dialogue in an efficient and effective manner. In some embodiments, the server is connected to a plurality of devices to serve as a backend of these devices to drive different dialogues with different users on different topics.

The device 810 includes, in addition to other components, a local dialogue manager 820, devised for the device with respect to the current state of the dialogue, and a local dialogue tree 830, which is a portion of the overall dialogue tree 750 and carved out for the device based on the progression and the current state of the dialogue. In some embodiments, such a local dialogue tree 830 cached on the device 810 is determined and deployed based on an assessment that this portion of the dialogue tree is likely to be needed in the near future by the device 810 to drive the dialogue with user 800 given the current state of the dialogue and/or known preferences of the user.

With the local version of the dialogue manager and the dialogue tree being deployed on the device 810, whenever feasible, the dialogue is managed by the local dialogue manager based on the cached local dialogue tree 830. It is in this manner, the traffic and bandwidth consumption caused by the frequent communication between the device 810 and the server 840 is reduced. In operation, if content of the utterance of user 800 is within the cached dialogue tree 830, determined by the local dialogue manager 820, the device 810 then provides the response from the cached dialogue tree 830 to the user without having to communicate with the server. Thus, the speed of responding to the user 800 may also improve.

If there is a cache miss, i.e., given the user's input, the local dialogue manager 820 does not find the response in the cached dialog tree 830, the device 810, it sends a request to the server 840 with information related to the current dialogue state, and subsequently receives a response identified by the dialogue manager 860 in the server 840 based on the full dialogue tree 750. Because there is a miss, with the response from the server 840, the device 810 also receives updated local dialogue tree (DT) and local dialogue manager (DM) from the server so that the previous local version of the DT and DM may be updated with updated version that is generated adaptively based on the progression of the dialogue.

In this illustrated embodiment, the server 840 comprises a controller 850, a dialogue manager 860, and a local DM/DT generator 870 (local DM refers to the local dialogue manager 820 and local DT refers to local dialogue tree 830). The functional role of the dialogue manager 860 is the same as in the traditional system, to determine a response based on an input from the user in accordance with a dialogue tree 750 selected to drive the dialogue. In operation, upon receiving a request from the device 810 for a response (with user's information), the controller 850 invokes not only the dialogue manager 860 to generate the requested response but also the local DM/DT generator 870 to generate, for the requesting device 810, the updated local dialogue tree 830 (DT) and the local dialogue manager 820 (DM) with respect to the dialogue tree 750 and a current dialogue state, estimated by the dialogue manager 860 based on the received user's information. Such generated local DT/DM are then sent to the device 810 to update the previous version cached therein.

Figure 9:
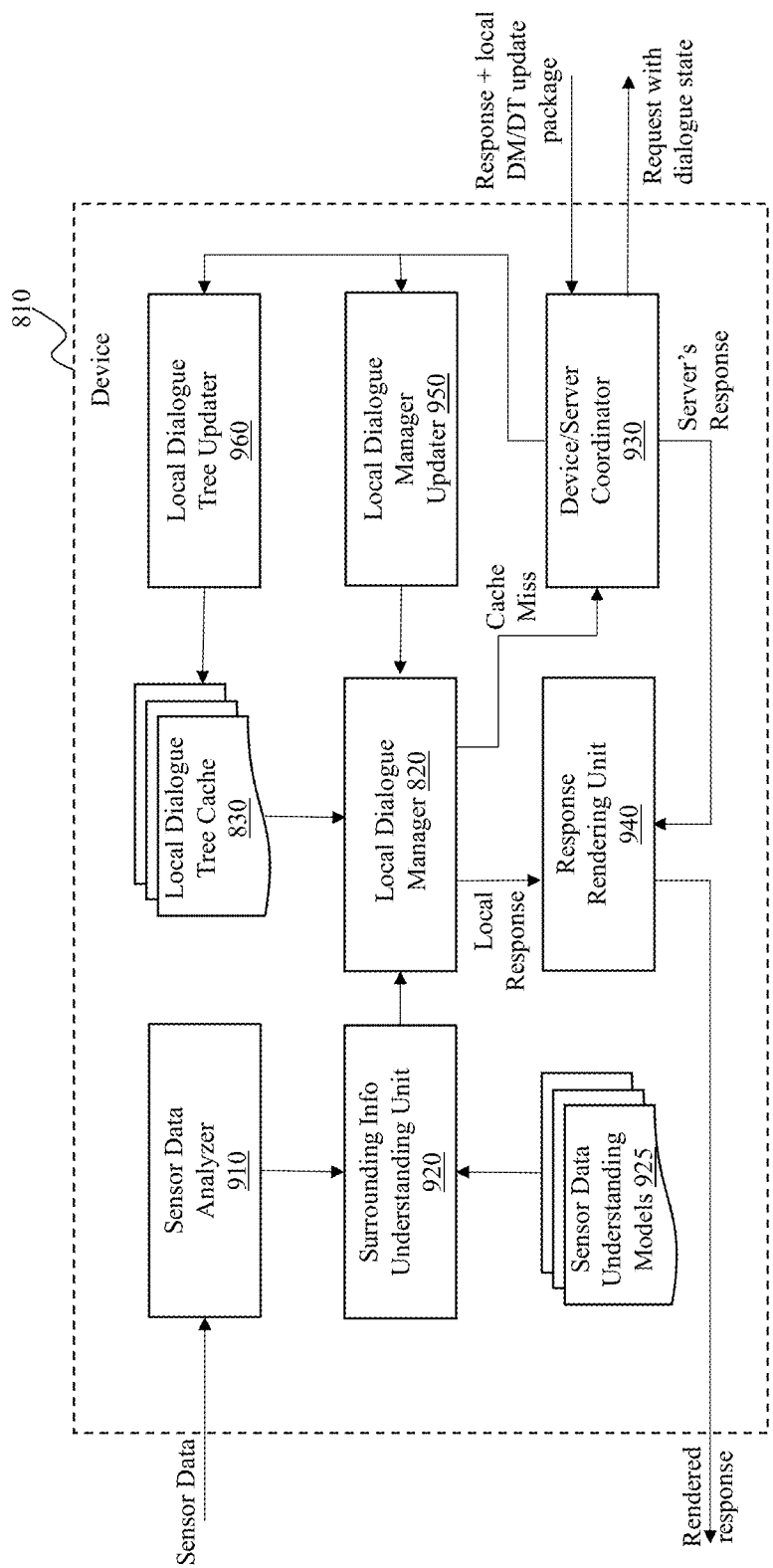
FIG. 9 depicts an exemplary high level system diagram of a device for human machine dialogue management, according to an embodiment of the present teaching.
Figure 10:
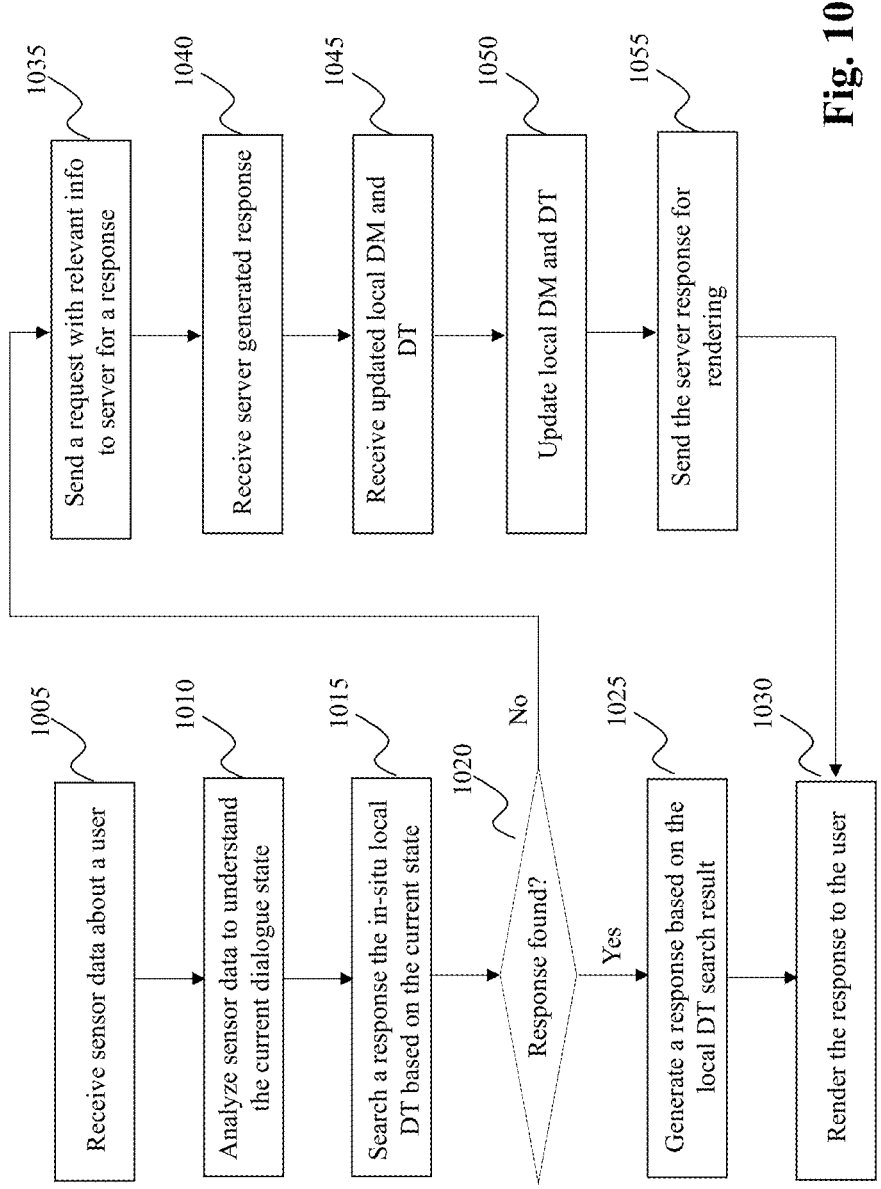
FIG. 10 is a flowchart of an exemplary process of a device for human machine dialogue management, according to an embodiment of the present teaching.

FIG. 9 depicts an exemplary high level system diagram of the device 810, according to an embodiment of the present teaching. As discussed herein, the device 810 may be a user device, an agent device, or a combination thereof. FIG. 9 shows the relevant functional components used to implement the present teaching and each of such components may reside on either a user device or an agent device and they work together in a coordinated manner to achieve the aspects of the functions related to the device 810 of the present teaching. In the illustrated embodiment, the device 810 comprises a sensor data analyzer 910, a surrounding information understanding unit 920, the local dialogue manager 820, a device/server coordinator 930, a response rendering unit 940, a local dialogue manager updater 950, and a local dialogue tree updater 960. FIG. 10 is a flowchart of an exemplary process of the device 810, according to an embodiment of the present teaching. In operation, the sensor data analyzer 910 receives, at 1005 of FIG. 10, sensor data from user 800. Such received sensor data may be multi-modal, including, e.g., acoustic data representing the speech of the user and/or visual data corresponding to visual representation of the user (e.g., facial expression) and/or the surrounding of the dialogue scene.

Upon receiving the sensor data, the sensor data analyzer 910 analyzes, at 1010, the received data and extracts relevant features from the sensor data and send to the surrounding information understanding unit 920. For example, based on acoustic features extracted from audio data, the surrounding information understanding unit 920 may determine the text corresponding to the utterance from the user 800. In some embodiments, features extracted from visual data may also be used to understand what is happening in the dialogue. For instance, lip movement of the user 800 may be tracked and features of the lip shape may be extracted and used to understand, in addition to the audio data, the text of the speech that the user 800 uttered. The surrounding information understanding unit 920 may also analyze the features of the sensor data to achieve understanding of other aspects of the dialogue. For instance, the tone of the speech from the user, the facial expression of the user, objects in the dialogue scene, etc. may also be identified and used by the local dialogue manager 820 to determine a response.

In deriving an understanding of the current state of the dialogue (e.g., what the user said, or in what manner), the surrounding information understanding unit 920 may rely on various models or sensor data understanding models 925, which may include, e.g., acoustic models for recognizing the sounds in the dialogue scene, natural language understanding (NLU) models for recognizing what was uttered, object detection models for detecting, e.g., user face and other objects in the scene (trees, desk, chair, etc.), emotion detection models for detecting facial expressions or for detecting tones in speech associated with different emotional states of a person, etc. Such an understanding of the current state of the dialogue may then be sent, from the surrounding information understanding unit 920 to the local dialogue manager 820 to enable it to determine a response to the user based on the local dialogue tree 830.

Upon receiving the current dialogue state, the local dialogue manager (DM) 820 is invoked to search, at 1015, a response in the local dialogue tree (DT) 830. As discussed herein, a current dialogue state may include one or more types of information such as a current utterance of the user, the estimated user emotion/intent, and/or the surround information of the dialogue scene. A response to the current user's utterance is generally generated based on the content of the utterance as well as a dialogue tree such as dialogue 750 that is used to drive the dialogue. According to the present teaching, the local DM 820, once invoked, searches the local DT 830 to see if the local DT 830 can be used to identify an appropriate response. The search is based on the content of the current utterance. The intended purpose of deploying the local DM 820 and the local DT 830 is that in most situations, a response can be found locally, saving the time and traffic to communicate with the server 840 to identify a response. If this is the case, as determined at 1020, the content of the current utterance from the user falls on a non-leaf node within the local DT 830, the response is one of the branches from the non-leaf node. That is, the local DM 820 generates, at 1025, a response based on the search of the local DT 830 and such generated response is then rendered, by the response rendering unit 940 at 1030, to the user.

In some situations, a response cannot be found in the local DT 830. When that occurs, a response needs to be generated by the server 840 in accordance with the overall dialogue tree 750. There may be different scenarios in which a response cannot be found by the local DM 820 based in the local DT 830. For example, the content of the current utterance from the user may not be found in the local DT 830. In this case, the response to a non-recognized utterance from the user is to be determined by the server 840. In a different situation, the current utterance is found in the local DT 830 yet the response thereof is not stored locally (e.g., the current dialogue state corresponds to a leaf node of the local DT 830). In this case, a response is also not available locally. In both scenarios, the local dialogue tree cached in 830 cannot be used to drive the dialogue further and then the local DM 820 invokes the device/server coordinator 930 to send, at 1035, a request to the server 840 for a response with information relevant to the dialogue state to facilitate the server to identify an appropriate response. The device/server coordinator 930 subsequently receives, at 1040 and 1045, respectively, the response sought and the renewed local DM and local DT. Upon receiving the updated local DM and local DT, the device/server coordinator 930 then invokes the local dialogue manager updater 950 and the local dialogue tree updater 960 to update, at 1050, the local DM 820 and local DT 830. The device/server coordinator 930 also sends, at 1055, the received response to the response rendering unit 940 so that the response may be rendered at 1030 to the user.

Figure 11:
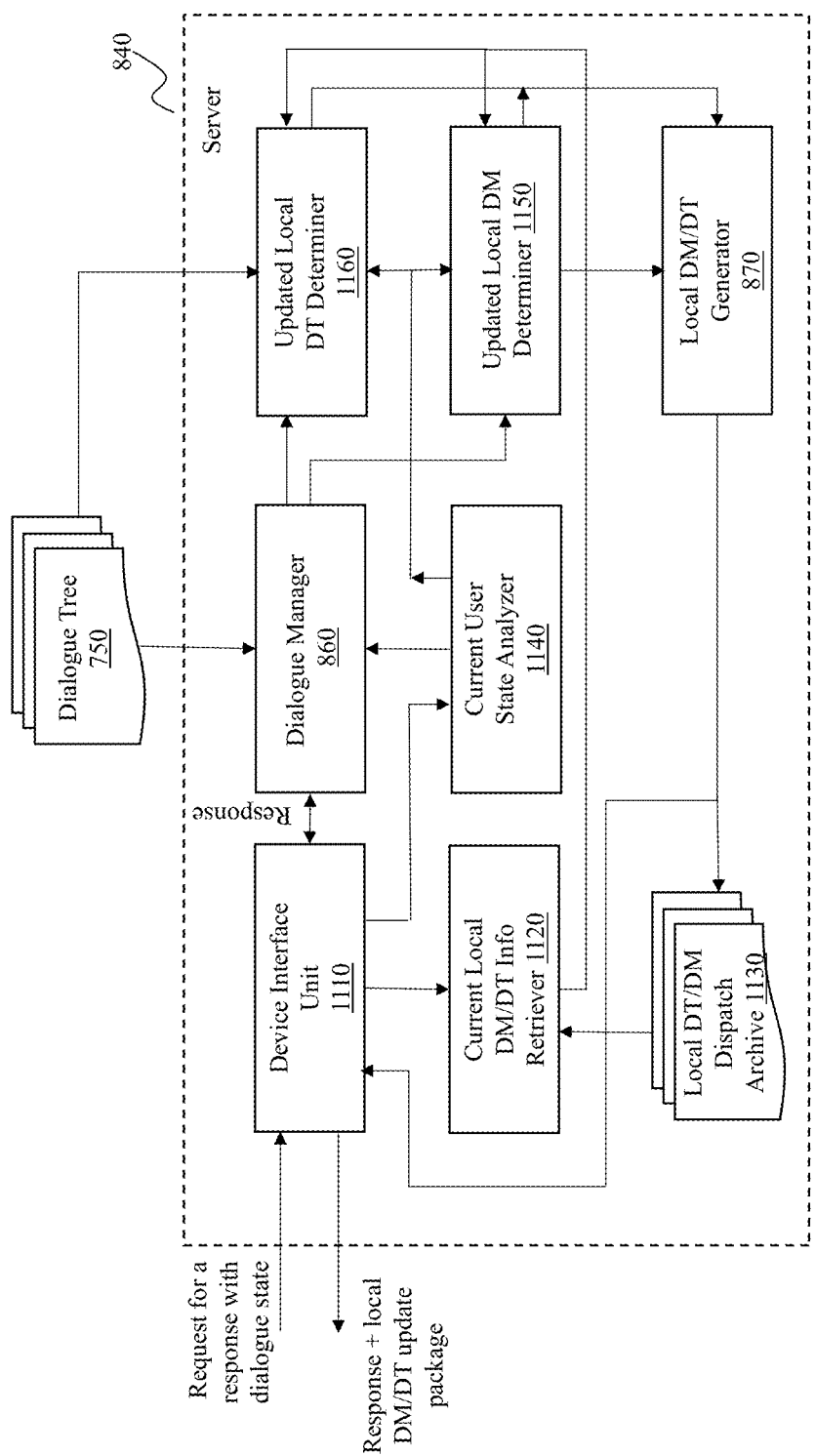
FIG. 11 depicts an exemplary system diagram of a server for human machine dialogue management, according to an embodiment of the present teaching.
Figure 12:
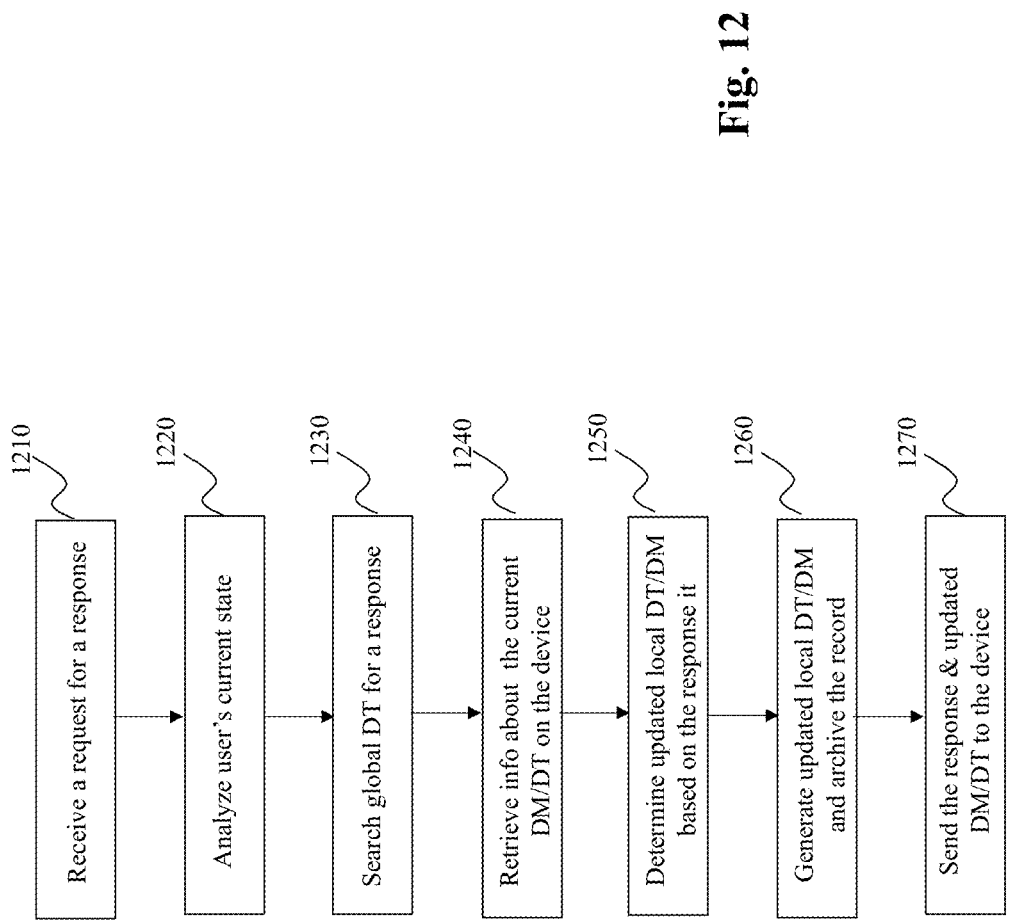
FIG. 12 is a flowchart of an exemplary process of a server for human machine dialogue management, according to an embodiment of the present teaching.

FIG. 11 depicts an exemplary system diagram of the server 840, according to an embodiment of the present teaching. In this illustrated embodiment, the sever 840 comprises a device interface unit 1110, a current local DM/DT information retriever 1120, a current user state analyzer 1140, the dialogue manager 860, an updated local DT determiner 1160, an updated local DM determiner 1150, and a local DM/DT generator 870. FIG. 12 is a flowchart of an exemplary process of the server 840, according to an embodiment of the present teaching. In operation, when the device interface unit 1110 receives, at 1210 of FIG. 12, a request from a device seeking a response with information relevant to the current state of the dialogue, it invokes the current user state analyzer 1140 to analyze, at 1220, the received relevant information to understand the user's input. To identify a response to the user's input, the dialogue manager 860 is invoked to search, at 1230, the full dialogue tree 750 to obtain a response.

As discussed herein, when the server 840 is requested to provide a response to a dialogue at a device, it indicates that the local DM 820 and the local DT 830 previously deployed on that device no longer works (they already led to a miss) for that local dialogue. As such, in addition to provide a response for the device, the server 840 also generates updated local DM and local DT to be cached at the device. In some embodiments, to achieve that, the device interface unit 1110 also invokes the current local DM/DT Info retriever 1120 to retrieve, at 1240, information related to the local DM/DT previously deployed on the device.

Such retrieved information about the previously deployed local DM and local DT, together with the currently server generated response and the current state of the dialogue, are sent to the updated local DT determiner 1160 and the updated local DM determiner 1150 to determine, at 1250, an updated local DT and an updated local DM with respect to the current response and the current dialogue state. Such determined updated local DM/DT are then sent to the local DM/DT generator 870, which then generates, at 1260, the updated local DM/DT to be sent to the device. The generated updated local DM/DT are then archived in the local DT/DM dispatch archive 1130 and then sent to the device by the device interface unit 1110. In this manner, whenever there is a miss, the server 840 updates the local DM/DT on the device so that the communication traffic and the bandwidth required for the server to support the device may be reduced and, hence, the speed of responding to users in human machine dialogues may be enhanced.

Traditionally, a dialogue management system such as the dialogue manager 840 takes in text (e.g., generated based on speech understanding) and output text based on a search of a dialogue tree. In a sense, a dialogue tree corresponds to a decision tree. At each step of a dialogue driven based on such a decision tree, there may be a node representing a current utterance and multiple choices branching from the node representing all possible answers connected to the node. Thus, from each node, a possible response may be along any of the multiple paths. In this sense, the process of a dialogue traverses a dialogue tree and forms a dialogue a path, as shown in FIG. 4B. The job of the dialogue manager is to determine a choice at each node (representing an utterance of the user) by, e.g., optimizing some gain in terms of the underlying dialogue. The determination of the selected path may take time based on information from different sources and different aspects of the understanding of the scenario surrounding the dialogue.

In addition, due to limited computation power and memory, much of the computation work to generate a response to the user is performed at a server, e.g., 720 in FIG. 7. For example, when user's information is received, the server 720 may analyze the user's information to understand what is said. The dialogue manager 740 residing on the server then searches the dialogue tree 750 to identify an appropriate response. As discussed herein, this dialogue process heavily relies on the backend server and requires back and forth communication traffic between the device 710 and the server 720. This costs time and bandwidth, affecting the server's ability to scale in conducting concurrent real-time dialogues with a plurality of users.

The present teaching further discloses an approach that enable further reduction of the response time in human machine dialogues by predicting which path(s) in the dialogue tree 750 the user likely will take in the near future and preemptively generating predicted responses along the predicted path. The prediction of the path for each user may be based on models that characterize, e.g., preferences of the user, and are created via machine learning based on, e.g., past dialogue histories and/or common knowledge. Such trainings may be personalized at different levels of granularity. For instance, the models learned for prediction dialogue paths may be individualized based on past data collected with respect to individuals. The models for such dialogue path prediction may also be individualized by training the personalized models based on relevant training data, e.g., to train a model for a group of users who share similar characteristics, training data for similar users may be used. Such training and prediction may be performed offline and the trained result may then be applied for online operations to reduce both the response time and the computational burden of the dialogue manager so that the server may scale better to take care of a high volume of requests.

Figure 13:
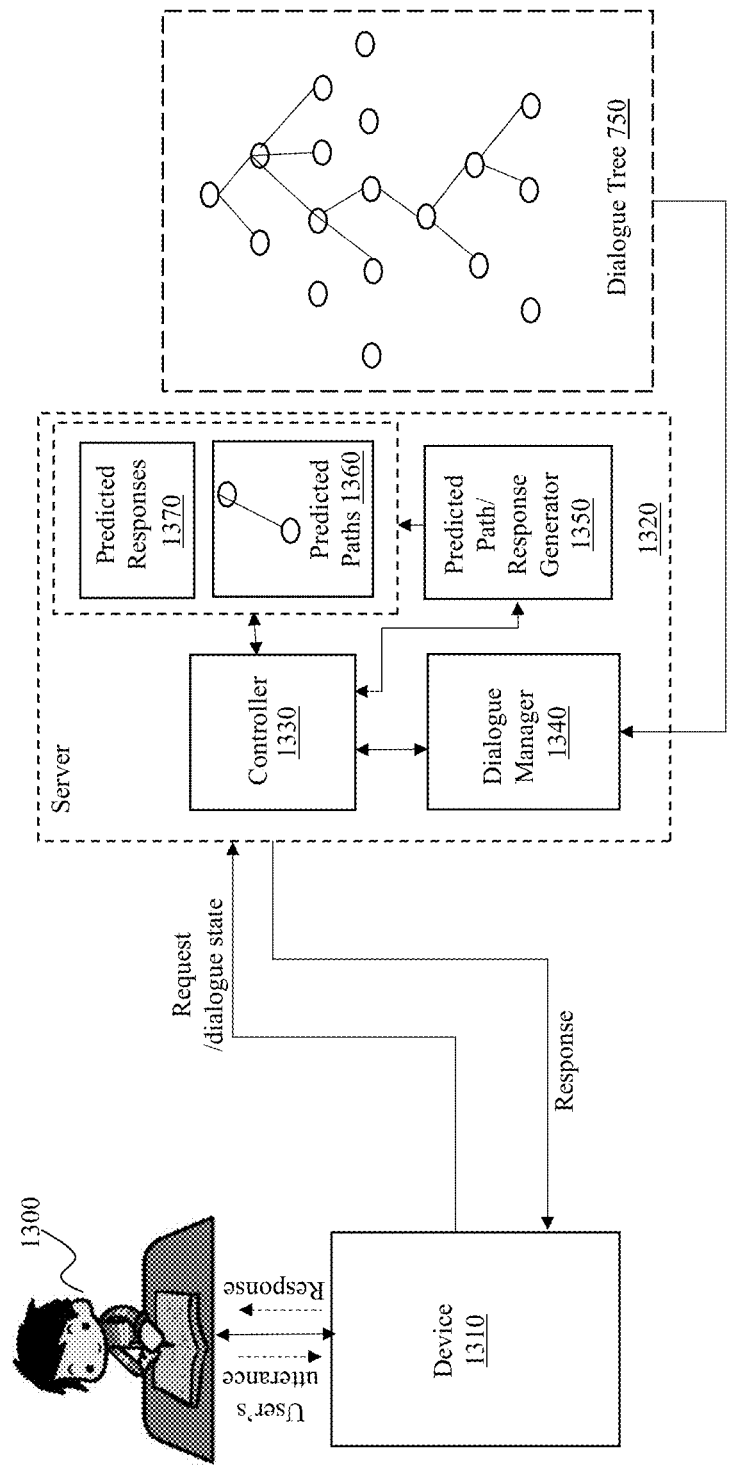
FIG. 13 depicts an exemplary system diagram of a server device configuration for human machine dialogue management via preemptively generated dialogue content, according to an embodiment of the present teaching.

By predicting dialogue path(s) and generating likely responses preemptively, when a response is among the preemptively generated responses, the pre-generated response may then be directly provided to the user without having to invoking the dialogue manager to search the dialogue tree, e.g., 750. If a response is not among those preemptively generated, a request may then be made by requesting the dialogue manager to search the dialogue tree to come up with the response. FIG. 13 depicts an exemplary embodiment of the framework of using preemptively predicted a dialogue path (subpart of the overall dialogue tree 750) and dialogue content (responses), according to an embodiment of the present teaching. In this illustrated embodiment, a user 1300 communicating via a device 1310, which may be similarly constructed as in FIG. 7 and communicate with a server 1320 that utilizes preemptively predicted dialogue path and responses to enhance the latency in responding to a human user. In this illustrated embodiment, the server 1320 comprises a controller 1330, a dialogue manager 1340, a predicted path/response generator 1350, that generates both predicted dialogue paths 1360 and accordingly the preemptively generated responses 1370. In operation, when the device 1310 receives user information (utterance, video, etc.), to determine a response, the device 1310 sends a request to the server 1320, seeking a response with information related to the dialogue state such as the utterance and/or observations of the surrounding of the dialogue, e.g., user's attitude, emotion, intent, the objects and characterization thereof in the dialogue scene. If the requested response is in the predicted paths 1360, a corresponding preemptively generated response in 1370 is then retrieved directly from the predicted responses 1370 and sent to the device 1310. In this manner, as the dialogue manager 1340 is not invoked to process the request and to search the dialogue tree 750 to obtain the response so that the latency of providing the response is improved.

Figure 14:
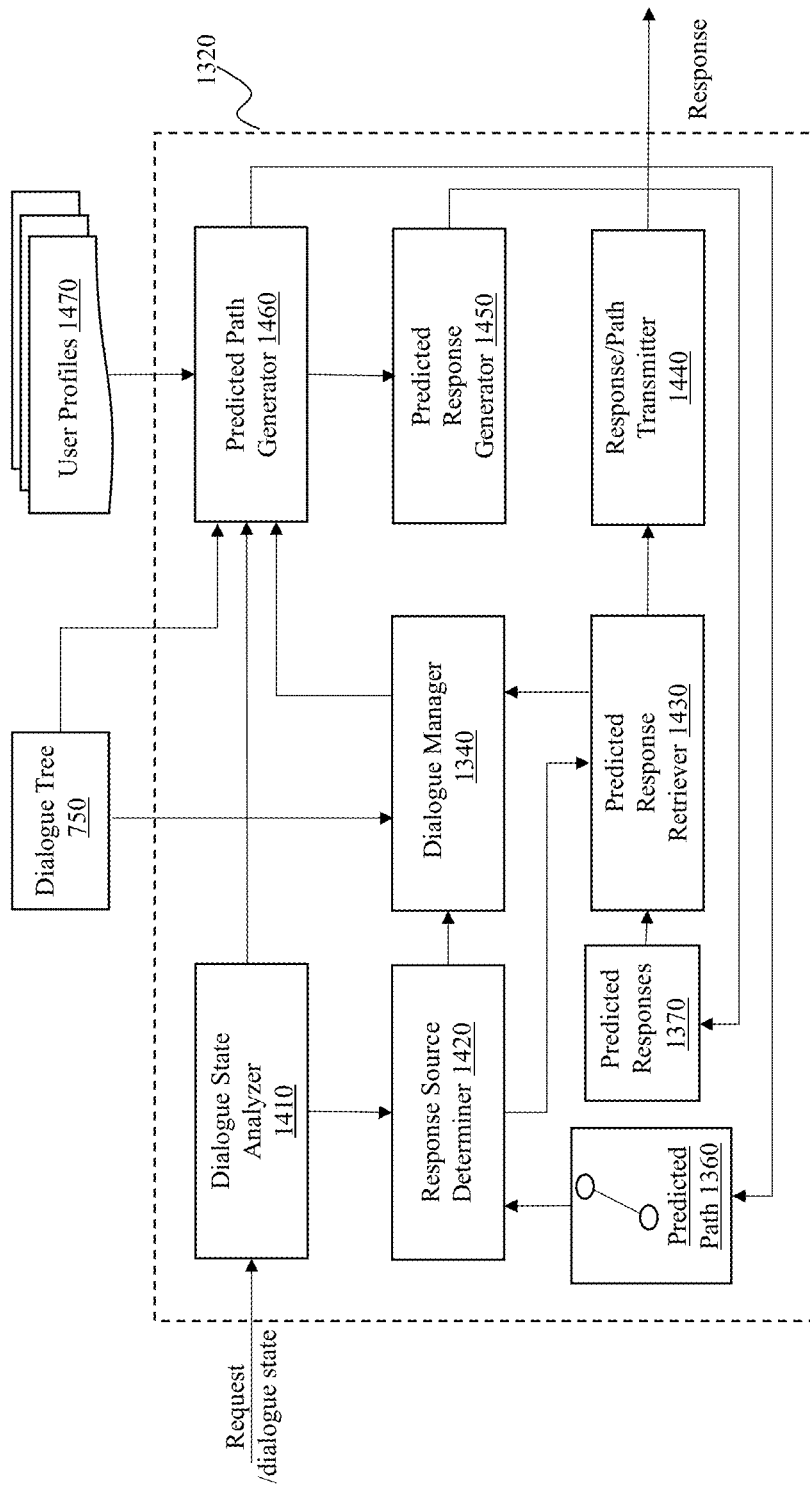
FIG. 14 depicts an exemplary system diagram of a server for human machine dialogue management via preemptively generated dialogue content, according to an embodiment of the present teaching.
Figure 15:
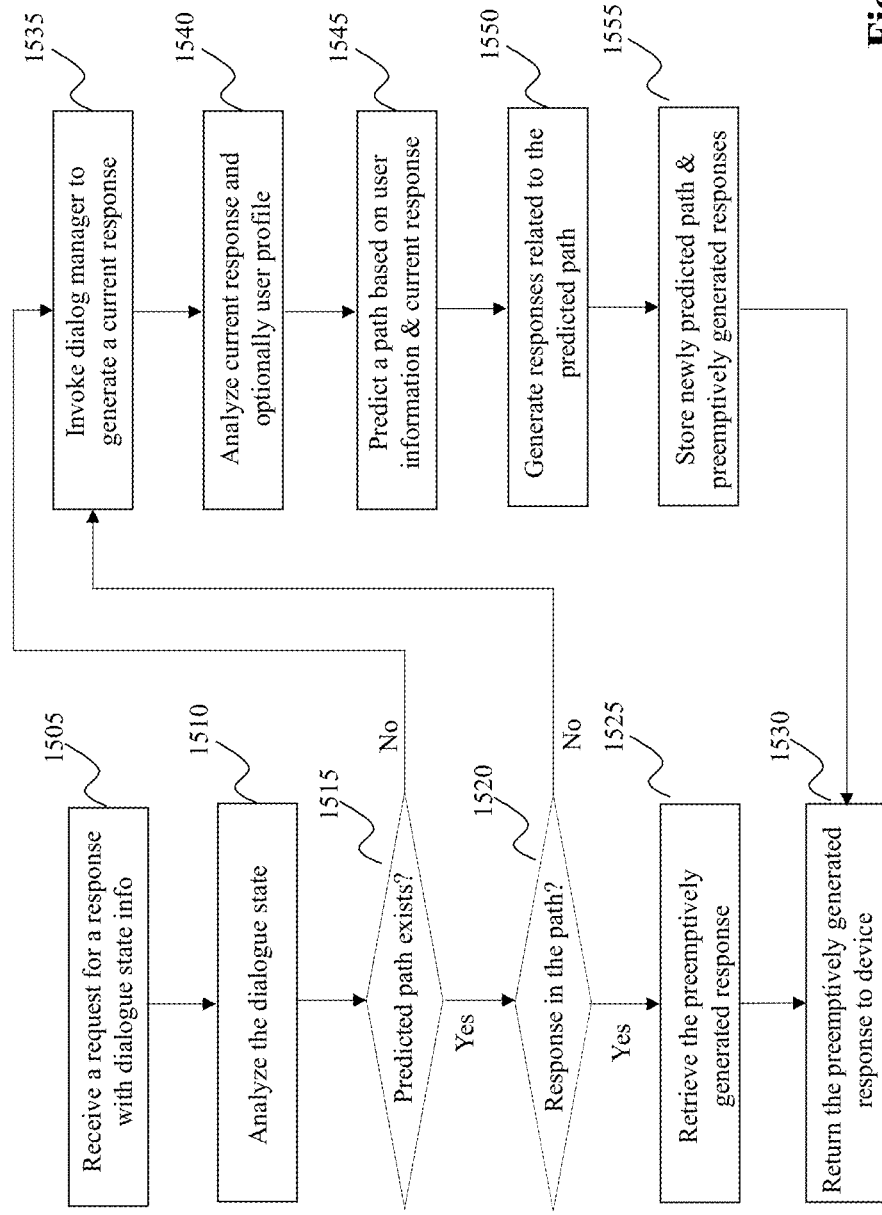
FIG. 15 is a flowchart of an exemplary process of a server for human machine dialogue management via preemptively generated dialogue content, according to an embodiment of the present teaching.

FIG. 14 depicts an exemplary high level system diagram of the server 1320, according to an embodiment of the present teaching. In the illustrated embodiment, the server 1320 comprises a dialogue state analyzer 1410, a response source determiner 1420, the dialogue manager 1340, a predicted response retriever 1430, a response transmitter 1440, a predicted path generator 1460, and a predicted response generator 1450. FIG. 15 is a flowchart of the exemplary process of the server 1320, according to an embodiment of the present teaching. In operation, the dialogue state analyzer 1410 receives, at 1505 of FIG. 15, a request with information related to the state of the underlying dialogue including, e.g., acoustic data representing the speech of the user or analyzed speech of the user and optionally other information related to the dialogue state. Such received information is analyzed, at 1510. To determine whether a response appropriate to respond to the user's utterance has been preemptively generated previously, the response source determiner 1420 is invoked to determine, at 1515, whether a predicted path relevant to the user's current utterance exists based on what is stored in predicted path 1360. If a predicted path 1360 relevant to the user's current utterance exists, it is further checked, at 1520, whether a desired response for the current utterance with respect to the predicted path exists in the predicted path, i.e., whether the desired response for the current utterance has been preemptively generated. If the desired response has been previously generated, the response source determiner 1420 invokes the predicted response retriever 1430 to retrieve, at 1525, the preemptively generated response from the predicted responses 1370 and then invokes the response transmitter 1440 to send, at 1530, the preemptively generated response to the device 1310.

If either the predicted path relevant to the utterance does not exist, determined at 1515, or the desired response is not preemptively generated (in a predicted path), determined at 1520, the process proceeds to invoke the dialogue manager 1340, at 1535, to generate a response with respect to the current user's utterance. This involves searching the dialogue tree 750 to identify the response. In the event of a miss (i.e., a predicted path does not exist or an existing predicted path does not include the response), the dialogue manager 1340 may also activate the predicted path generator 1460 to predict a path given the current utterance/response identified. Upon being activated, to generate a predicted path, the predicted path generator 1460 may analyze, at 1540, the currently generated response and optionally also a profile for the user currently involved in the dialogue, which is retrieved from a user profile storage 1470. Based on such information, the predicted path generator 1460 predicts, at 1545, a path based on the current utterance/response, the dialogue tree 750, and optionally the user profile. Based on the predicted path, the predicted response generator 1450 generates, at 1550, predicted responses associated with the newly predicted path, i.e., preemptively generating responses. Such predicted new path and their preemptively generated predicted responses are then stored, at 1555, by the predicted path generator 1460 and the predicted response generator 1450 in the predicted path storage 1360 and the predicted responses storage 1370, respectively. Then the response so identified is returned, at 1530, to the device to respond to the user.

Figure 16:
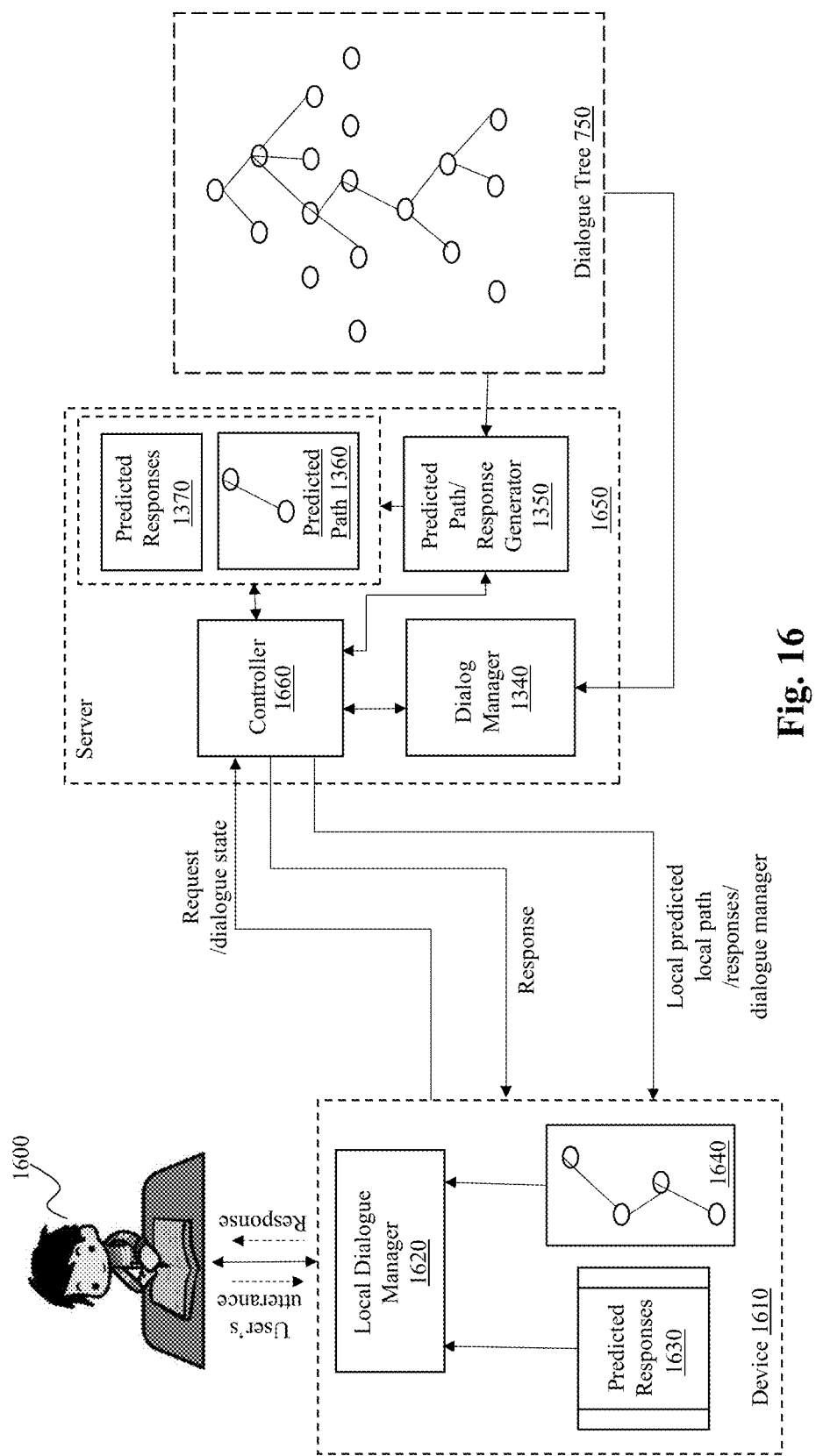
FIG. 16 depicts a different exemplary system diagram of a server device configuration for human machine dialogue management via preemptively generated dialogue content, according to an embodiment of the present teaching.

FIG. 16 depicts a different exemplary configuration between a device 1610 and a server 1650 in managing a dialogue with a user, according to embodiments of the present teaching. Compared with the embodiment shown in FIG. 13, to further enhance performance and reduce latency and traffic, the configuration in FIG. 16 also deploys, on the device 1610, a local dialogue manager 1620 with corresponding local predicted path 1640 as well as corresponding preemptively generated local predicted responses 1630. The local dialogue manager 1620 operates based on the local predicted path 1640 and the local predicted responses 1630 to drive the dialogue as much as it can. When there is a miss, the device sends a request with information related to the dialogue state to the server 1650 to seek a response. As shown, the server 1650 also stores server versions of the predicted path 1360 and server version of the predicted responses 1370. In some embodiments, the server predicted path 1360 and the server predicted responses 1370 stored on the server 1650 may not be the same as the local versions 1640 and 1630. For instance, the server predicted path 1360 may be more extensive than the local predicted path 1640. Such a difference may be based on different operational considerations such as limitations on local storage or transmission size restrictions.

In operation, when there is a miss on the device, the device 1610 sends a request to the server 1650, requesting a response for the on-going dialogue with information related to the dialogue. When that happens, the server 1650 may identify an appropriate response and sends the response to the device. Such a response identified by the serve may be one of the server predicted responses 1370 in the server predicted path 1360. If the response cannot be found in the server predicted path/responses, the server may then search in the overall dialogue tree to identify the response. With two levels (device and server) of cashed predicted path and responses, the time needed to generate a response is further reduced.

As shown in the configuration in FIG. 16, the device 1610 includes a local dialogue manager 1620 deployed to function locally to generate a response to a user 1600 by searching a local version 1640 of the predicted path 1360 and preemptively generated responses 1630 which are local version of the predicted responses stored on the server 1650. If the local dialogue manager 1620 finds a response locally on based on predicted path 1640 and predicted responses 1630, the device 1610 will provide the response to the user without requesting a response from the server 1650. In this configuration, when there is a miss, the device 1610 requests the server 1650 to provide a response. Upon receiving the request, the server 1650 may proceed to generate a response based on the server predicted path 1360 and the server predicted responses 1370. If the server predicted path 1360 and the server predicted responses 1370 are more extensive than the local predicted path 1640 and the corresponding local predicted responses 1630, a response not found in the local predicted path/responses may be included in the server predicted path/responses. Only if the server 1650 is unable to find a response in its predicted path 1360 and predicted responses 1370, then the server 1650 proceeds to search for a response in the overall dialogue tree 750.

In addition to identify a response for the device, the server 1650 may also generate updated local predicted path 1640, the corresponding local predicted responses 1630, as well as the updated local dialogue manager 1620 that is operable with respect to the updated local predicted path/responses. The updated local predicted path/responses and the updated local dialogue manager may then be sent to the device for future operation. The updated local version of the predicted path and predicted responses may be generated based on either the overall dialogue tree 750 or the server predicted path 1360 and server predicted responses 1370. In some situations, when the server cannot identify an appropriate response from the server predicted path 1360 and server predicted responses 1370, in this case, both the server and local versions of the predicted path/responses as well as local dialogue manager need to be updated. If an appropriate response, although not found on the device 1610, is identified from the server predicted path/responses, the server predicted path/responses may not need to be updated.

As discussed herein, the updated local predicted path/responses may be generated by the server when a request for a response is received. In some situations, the updated local predicted path/responses may be generated from the existing server predicted path/responses. In some situations, the updated server predicted path/responses may also need to be updated so that the updated local predicted path/responses may then be generated based on the updated server predicted path/responses that are generated based on the dialogue tree 750. In this case, the server may generate both updated server versions and local versions of predicted paths and predicted responses, i.e., the updates to predicted path and predicted responses occur at both the server 1650 and the device 1610. Once the updated local predicted path/responses are generated, the updated local dialogue manager may then be generated accordingly. Once generated, the updated local dialogue information (including the updated local predicted path/responses and the updated local dialogue manager) is then sent from the server to the device so that it can be used to update the local dialogue manager 1620, the predicted path 1640, and the predicted responses 1630 on the device.

Figure 17:
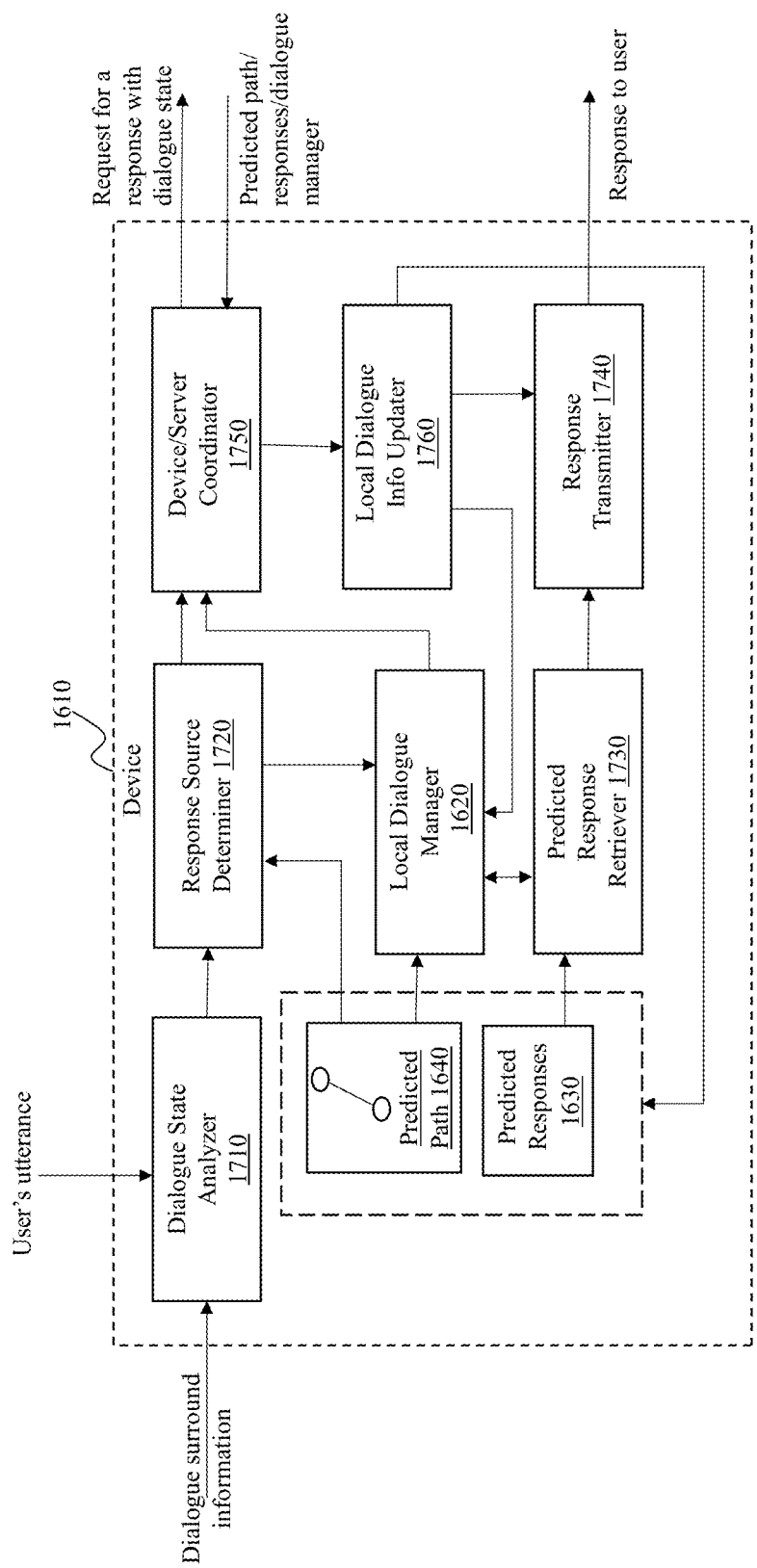
FIG. 17 depicts an exemplary system diagram of a device for human machine dialogue management via preemptively generated dialogue content, according to an embodiment of the present teaching.

FIG. 17 depicts an exemplary high level system diagram of the device 1610, according to an embodiment of the present teaching. To realize the exemplary configuration as shown in FIG. 16, the exemplary construct of the device 1610 comprises a dialogue state analyzer 1710, a response source determiner 1720, the local response manager 1620, a predicted response retriever 1730, a response transmitter 1740, a device/server coordinator 1750, and a predicted path/response updater 1760. The device 1610 also includes the local predicted path 1640 and the local predicted responses 1630, both of which are used by the local dialogue manager 1620 to drive the dialogue between the device and a user. As discussed herein, the local predicted path 1640 and the local predicted responses 1630 may be updated by the predicted path/response updater 1760 based on the updated version of the local predicted path/responses received from the server 1650 via the device/server coordinator 1750.

Figure 18:
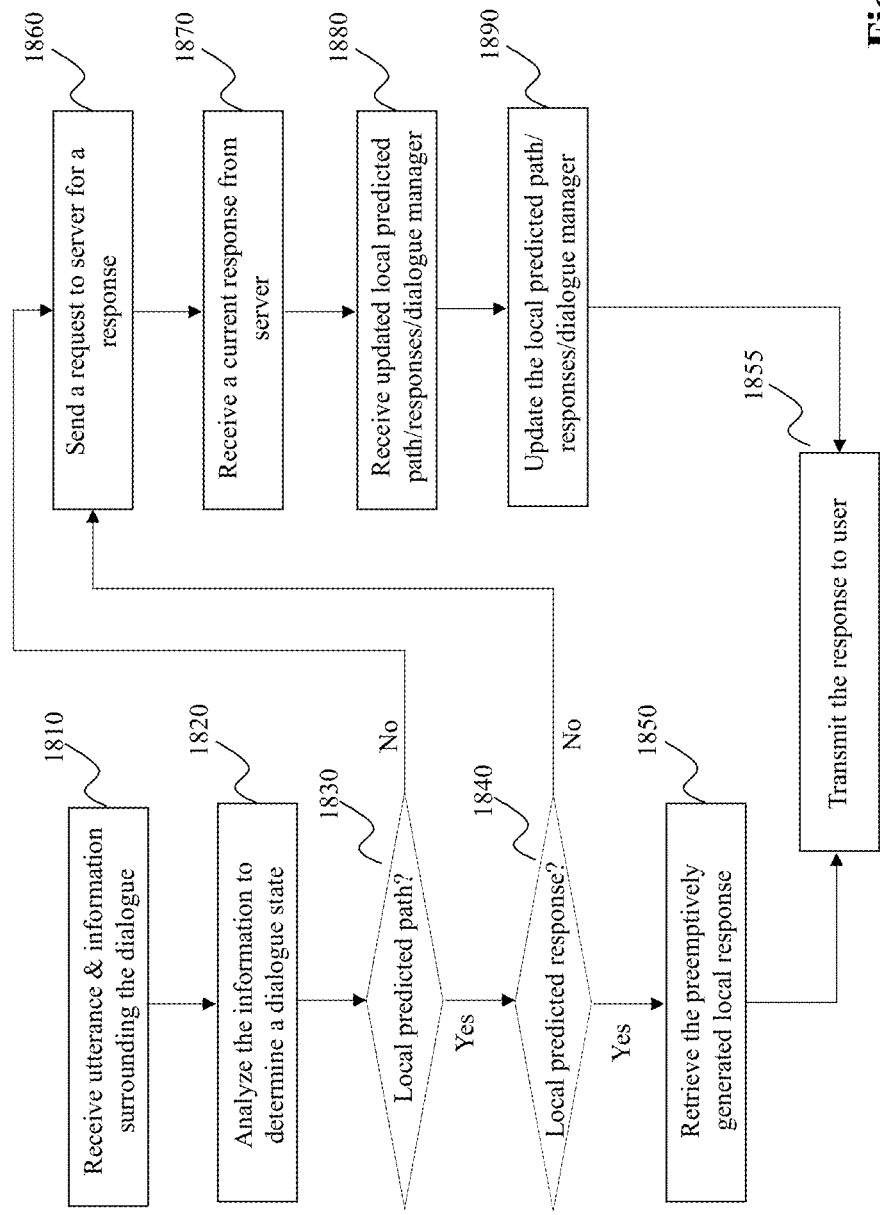
FIG. 18 is a flowchart of an exemplary process of a device for human machine dialogue management via preemptively generated dialogue content, according to an embodiment of the present teaching.

FIG. 18 is a flowchart of an exemplary process of the device 1610, according to an embodiment of the present teaching. In operation, when the dialogue state analyzer 1710 receives, at 1810 of FIG. 18, information related to the on-going dialogue (which includes both the user's utterance as well as other information surrounding the dialogue), it determines, at 1820, the dialogue state of the dialogue. The surround information related to the dialogue may include multimodal information such as the audio of the user/s utterance, the visual information about the user such as facial expression or gesture of the user, or other types of sensory data such as haptic information related to user's movement. The dialogue state determined by the dialogue state analyzer 1710 based on the received surround information may include the content of the user's utterance, the emotional state of the user determined based on, e.g., the facial expression and/or tune of speech of the user, an estimated intent of the user, relevant object(s) in the dialogue environment, etc.

Based on the user utterance in the current dialogue state, the response source determiner 1720 determines whether a response to the user's utterance can be identified based on locally stored predicted path 1640 and the locally stored predicted responses 1630. For example, at 1830, it is determined whether the local predicted path is relevant to the current utterance. The local predicted path may be relevant when it, e.g., includes a node that corresponds to the current utterance. If the local predicted path is relevant, it may further check, at 1840, whether the local predicted path includes a preemptively generated (predicted) response that can be used to respond to the user's utterance. If a preemptively generated response in the local predicted path is appropriate as a response to the user, the local dialogue manager 1620 is invoked to generate a response based on locally stored predicted path 1640 and the locally stored predicted responses 1630. In this case, the local dialogue manager 1620 invokes predicted response retriever 1730 to retrieve, at 1850, a preemptively generated response (e.g., according to the instruction of the local dialogue manager 1620) and forward the retrieved preemptively generated response to the response transmitter 1740 to transmit, at 1855, the locally identified response to the user. In this scenario, the device 1610 needs neither to request the server 1650 to provide a response (save time) nor to communicate with the server 1650 (reduce traffic) so that it effectively enhances the performance in terms of needed computation, the bandwidth, and the latency.

If the local predicted path is not relevant to the current utterance or an appropriate response to the user's utterance cannot be found in the local predicted responses, the device/server coordinator 1750 is invoked to communicate with the server 1650 for a response. To do so, the device/server coordinator 1750 sends, at 1860, a request for a response with information related to the dialogue state to the server 1650 and wait to receive a feedback. When the device/server coordinator 1750 receives the feedback from the server, the feedback may include the response sought, received at 1870, as well as an updated local predicted path with updated predicted responses, and an accordingly generated updated local dialogue manager, received at 1880. With such received local dialogue information, the local dialogue information updater 1760 proceeds to update, at 1890, the local dialogue information including the local predicted path 1640, the local predicted responses 1630, and the local dialogue manager 1620. The received response is then transmitted to the user at 1855 via the response transmitter 1440.

Figure 19:
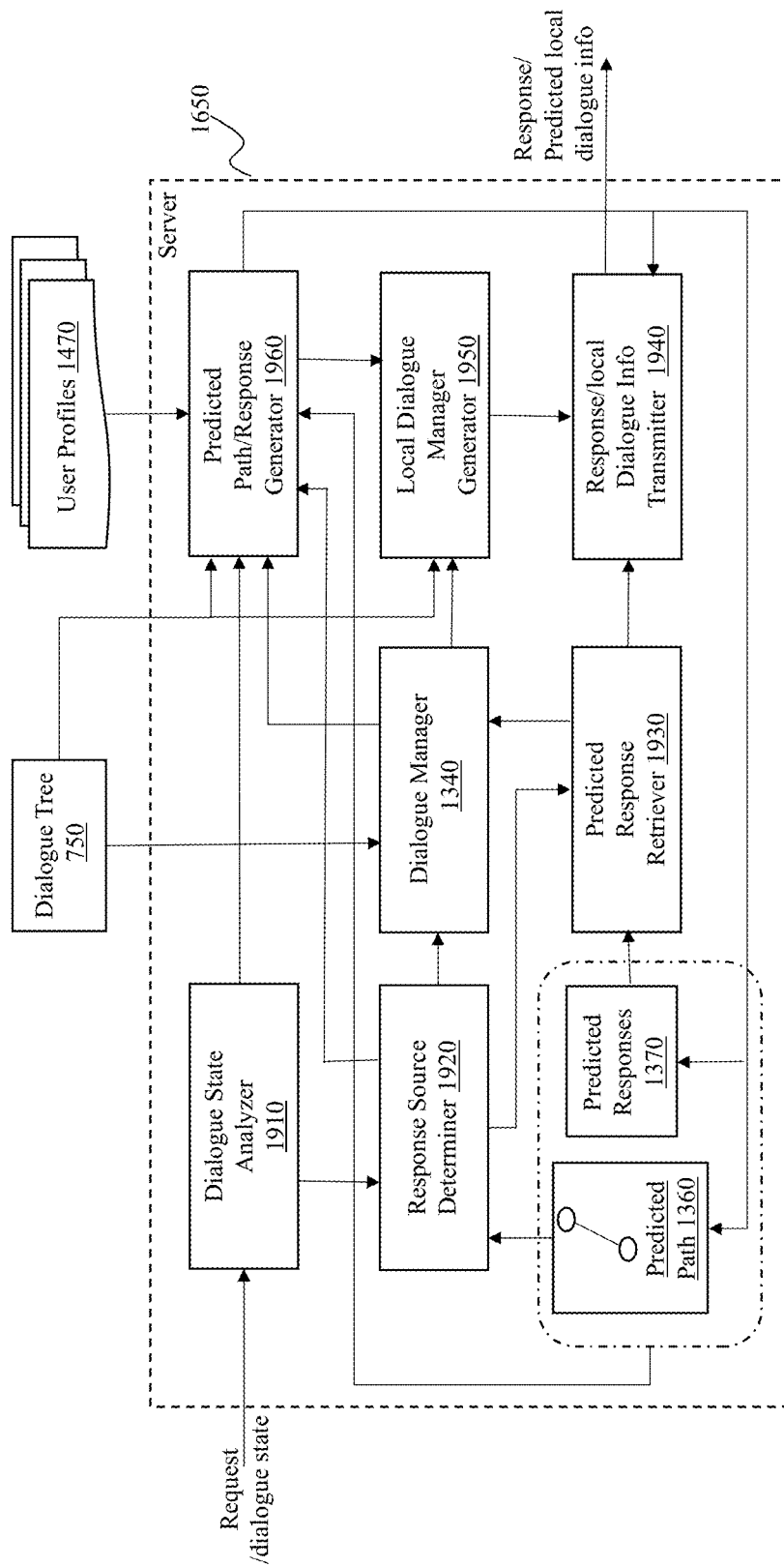
FIG. 19 depicts an exemplary system diagram of a server for human machine dialogue management via preemptively generated dialogue content, according to an embodiment of the present teaching.
Figure 20:
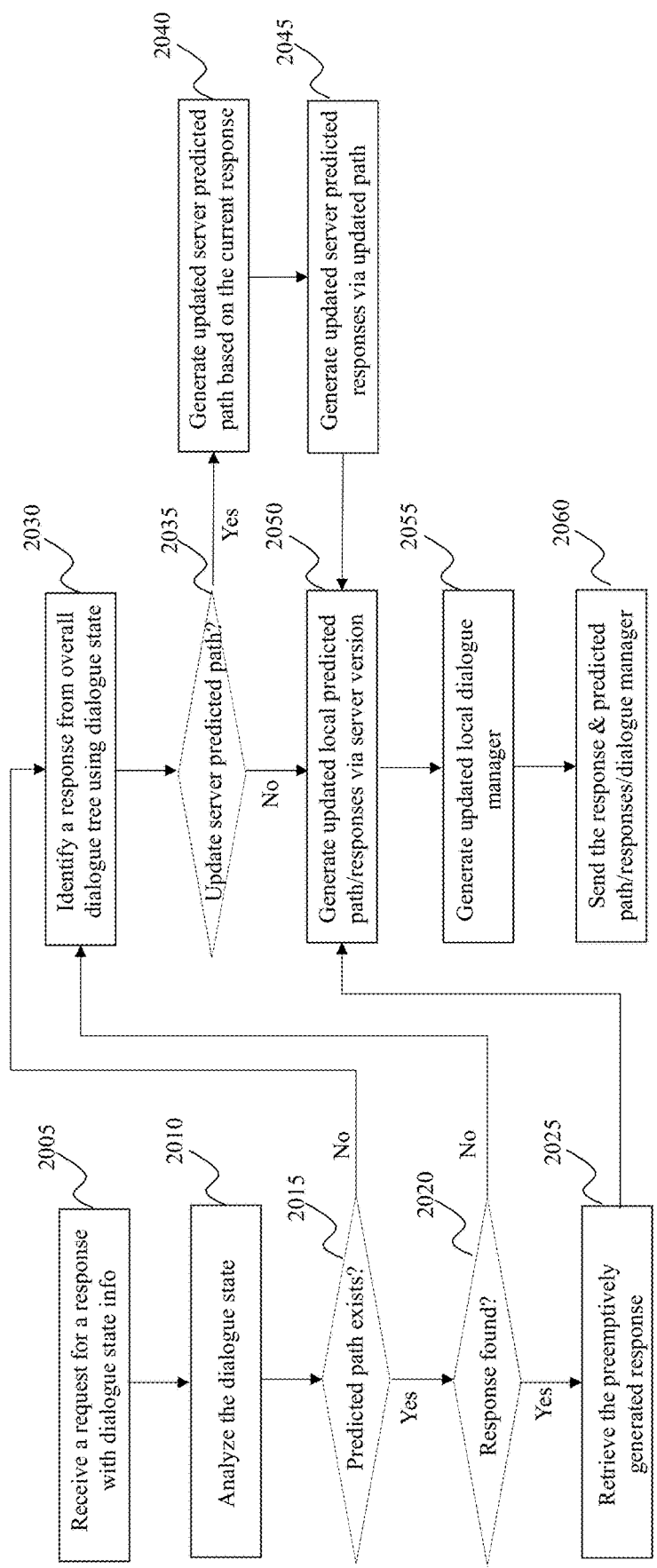
FIG. 20 is a flowchart of an exemplary process of a server for human machine dialogue management via preemptively generated dialogue content, according to an embodiment of the present teaching.

FIG. 19 depicts an exemplary high level system diagram of the server 1650, according to an embodiment of the present teaching. In this illustrated embodiment, the server 1650 comprises a dialogue state analyzer 1910, a response source determiner 1920, the dialogue manager 1340, a predicted response retriever 1930, a predicted path/responses generator 1960, a local dialogue manager generator 1950, and a response/local dialogue info transmitter 1940. FIG. 20 is a flowchart of an exemplary process of the server 1650, according to an embodiment of the present teaching. In operation, when the dialogue state analyzer 1910 receives, at 2005 of FIG. 20, a request for a response with associated dialogue state information from a device, it analyzes, at 2010, the received dialogue state and passes on information to the response source determiner 1920 to determine where the response sought is to be identified. In some situation, the response may be found from the server predicted responses associated with the server predicted path 1360. In some situations, the response may need to be identified from the overall dialogue tree 750.

If the server predicted path 1360 exists, determined at 2015, it is further determined, at 2020, whether a response to the current dialogue state can be found in the server predicted path 1360. If a response can be found in the server predicted path 1360, the predicted response retriever 1930 is invoked to retrieve, at 2025, the preemptively generated predicted response from 1370 and the retrieved response is sent to the response/path transmitter 1940 for transmitting the response together with other updated dialogue information including an updated local predicted path, updated predicted responses, and an updated local dialogue manager. If no appropriate server predicted path 1360 is available to generate a response (e.g., either there is no server predicted path or the existing server predicted path 1360 is not relevant with respect to the current dialogue state) or an appropriate response for the current dialogue state cannot be found in the server predicted path 1360, the response source determiner 1920 invokes the dialogue manager 1340 to generate, at 2030, a response with respect to the current dialogue state based on the overall dialogue tree 750.

As discussed herein, whenever the server is called upon to generate a response (i.e., there is a miss on the device), it indicates that the local predicted path and local predicted responses are no longer able to enable the local dialogue manager to drive the dialogue. Thus, in responding to the request to provide a response to the device, the server 1650 may also generate updated local predicted path and updated predicted responses for the device. In addition, an updated local dialogue manager may also need to be accordingly generated to be consistent with the updated local predicted path and responses. Such updated local dialogue related information may be generated by the server and sent to the device together with the response generated.

Furthermore, as there may be also a miss at the server with respect to the server predicted path 1360 and the server predicted responses 1370, the server predicted path and server predicted responses may also need to be updated when there is a miss at the server level. In this scenario, both the server and local versions of the predicted paths and responses may be re-generated and used to update the previous versions. Thus, it is determined, at 2035, whether the server predicted path and the server predicted responses need to be updated. If so, the predicted path/response generator 1960 is invoked to generate, at 2040 and 2045, the updated server predicted path and server predicted responses, respectively. In this scenario, the updated server predicted path/responses are used to generate, at 2050, the updated local predicted path and the corresponding updated predicted responses.

If the server predicted path/responses do not need to be updated, determined at 2035, the updated local predicted path and responses are then generated, at 2050, based on the current version of the server predicted path and server predicted responses. Based on the updated local predicted path and updated local predicted responses are then used, by the local dialogue manager generator 1950 to generate, at 2055, an updated local dialogue manager 1620, based on the updated local predicted path and the updated local predicted responses in accordance with the dialogue tree 750 and the dialogue manager 1340. The response generated by the server is then sent, at 2060, to the device together with the updated local dialogue information including the updated local predicted path, the updated local predicted responses, and the updated local dialogue manager so that they can be used by the local dialogue information updater 1760 (FIG. 17) to update the local predicted path 1640, the local predicted responses 1630, and the local dialogue manager 1620.

Figure 21:
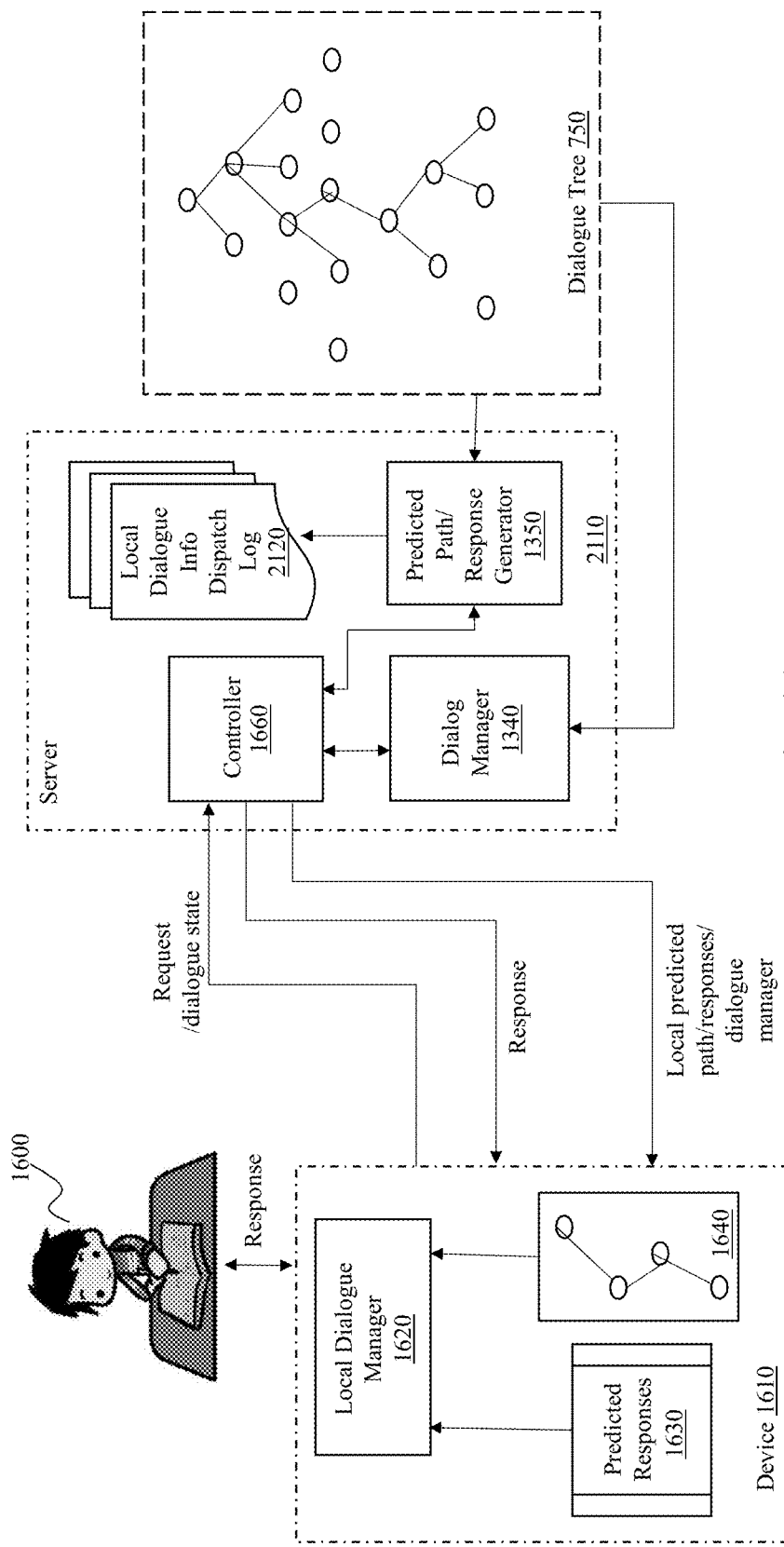
FIG. 21 depicts yet another different exemplary system diagram of a server device configuration for human machine dialogue management via preemptively generated dialogue content, according to an embodiment of the present teaching.

FIG. 21 depicts yet another exemplary operational configuration between a device and a server in managing a dialogue with a user, according to embodiments of the present teaching. In this illustrated embodiment, instead of retaining copies of server predicted path and server predicted (preemptively generated) responses in the server, the server keeps a record of what is dispatched to the device related to predicted paths/responses/local dialogue managers. In this configuration, as there is no server version of the predicted path and responses, whenever the server is requested to provide a response, the dialogue manager in the server will identify such a response directly from the overall dialogue tree. Based on such identified response, the server then proceeds to generate updated local predicted path/responses and updated local dialogue manager, which can then be transmitted, together with the response, to the device. The received updated local versions of the predicted path/responses/dialogue manager may then be used to replace the previous local dialogue manager 1620, the previous local predicted path 1640, and the previous local predicted responses 1630 in order to facilitate further local dialogue management on the device. This is shown in FIG. 21 where a server 2110 in this configuration includes a local dialogue information dispatch log 2120.

With this configuration, the device 1610 performs localized dialogue management based on the local predicted path 1640 and corresponding local predicted (preemptively generated) responses 1630, both predicted by the server 2110 and deployed dynamically on the device 1610. The server 1670 may, upon receiving a request from a device and information related to the current dialogue state, identify a response that the device is not able to find in the previously deployed predicted path and then preemptively generate predicted dialogue path and predicted responses based on the received information. In this embodiments, the server 1670 may not maintain predicted dialogue paths for different devices and operate based on them. Rather, such predicted dialogue paths and responses are transmitted to individual devices to enable them to accordingly manage their own local dialogues. In this configuration, the server may retain the information in a dispatch log 2120 that records the local predicted dialogue paths and preemptively generated responses associated therewith transmitted to different devices. In some embodiments, such logged information may be used in generating corresponding updated local predicted paths and preemptively generated responses when the previous version can no longer be used to drive the dialogue.

Figure 22:
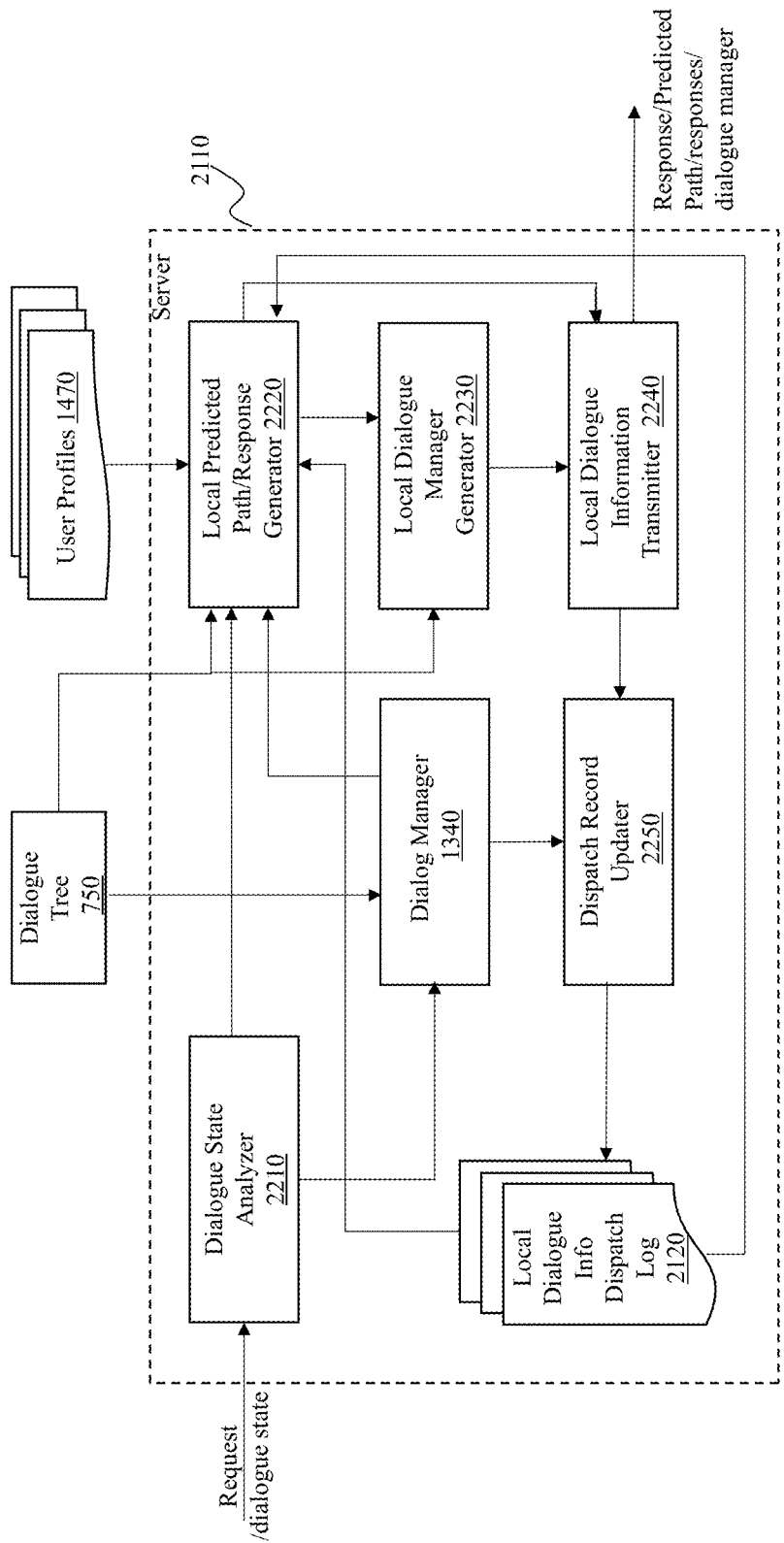
FIG. 22 depicts an exemplary system diagram of a server for human machine dialogue management via preemptively generated dialogue content, according to a different embodiment of the present teaching.
Figure 23:
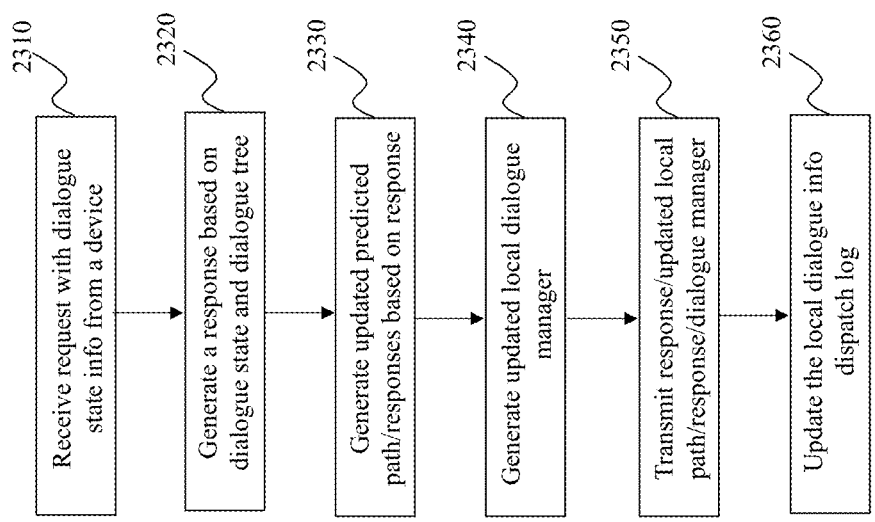
FIG. 23 is a flowchart of an exemplary process of a server for human machine dialogue management via preemptively generated dialogue content, according to a different embodiment of the present teaching.

FIG. 22 depicts an exemplary high level system diagram of the server 2110, according to an embodiment of the present teaching. As illustrated, the server 2110 comprises a dialogue state analyzer 2210, the dialogue manager 1340, a local predicted path/response generator 2220, a local dialogue manager generator 2230, a local dialogue information transmitter 2240, and a dispatch record updater 2250. FIG. 23 is a flowchart of an exemplary process of the server 2110, according to an embodiment of the present teaching. In operation, when a request is received, at 2310 by the dialogue state analyzer 2210, it is analyzed and then used by the dialogue manager 1340 to generate, at 2320, a response based on the dialogue state and the overall dialogue tree 750. As discussed herein, the dialogue state may include the utterance of the user operating on the device and other information surrounding the dialogue such as facial expression, estimated emotion state of the user, intent of the user, and relevant objects and characterization thereof in the dialogue scene. In some embodiments, when the dialogue manager 1340 generates the response, it may also consider the information surrounding the dialogue such as the emotional state of the user and/or profile information of the user such as what the user likes. For example, if the user's utterance is not responsive with a negative emotional state, the dialogue manager 1340 may identify a response that is more driven based on the profile of the user instead of following the set path in the dialogue tree 750. For instance, if the user's utterance is not quite relevant to the dialogue and the user appears to be frustrated, the dialogue manager 1340 may select a response that is more driven based on preference of the user rather than driven by the dialogue tree 750. If the user likes basketball and there is a basketball in the dialogue scene, the dialogue manager 1340 may decide to talk to the user about basketball to refocus the user before continuing on the initial topic of the dialogue.

Such a generated response is then used by the local predicted path/response generator 2220 to generate, at 2330, the updated local predicted path and updated local responses. The generation of such updated local dialogue information may be based on not only the response but also on additional information from the dialogue state and/or the profile of the user. In this manner, the local updated predicted path and responses are consistent with the response the dialogue manager 1340 generated, the current dialogue state, and/or the user's preferences. Based on the updated local predicted path and responses, an updated local dialogue manager is generated, at 2340 by the local dialogue manager generator 2230. The updated local dialogue information (the local predicted path, the local predicted responses, and the local dialogue manager) is then sent to the local dialogue information transmitter 2240, which then transmits, at 2350, such information to the device 1610 so that the local predicted path, the local predicted responses, and the local dialogue manager may be replaced with the updated version to drive the future dialogue locally on the device 1610. The dispatch record updater 2250 then updates, at 2360, the dialogue information dispatch log 2120.

Figure 24:
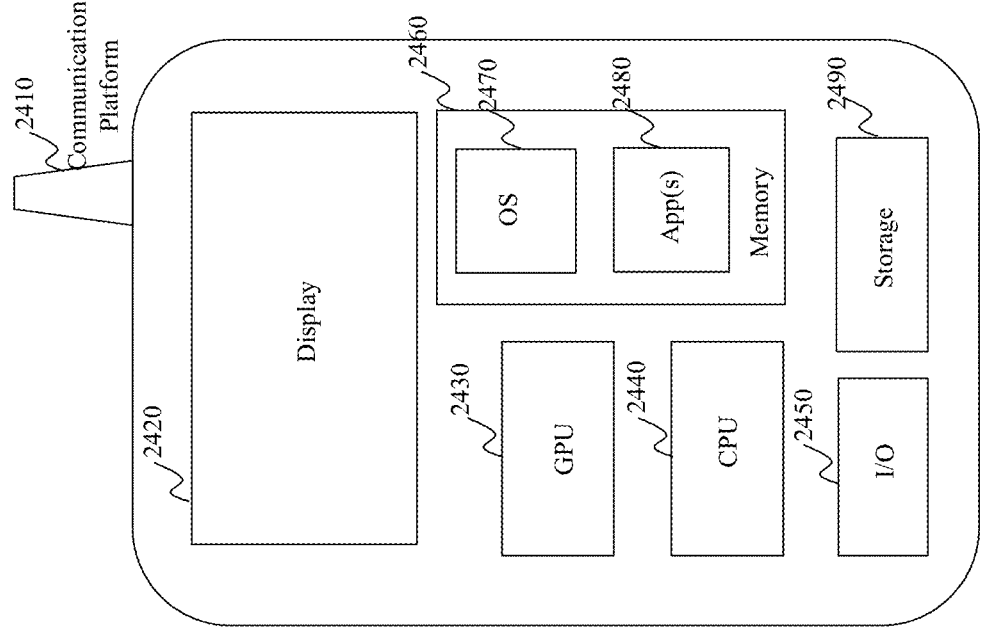
FIG. 24 is an illustrative diagram of an exemplary mobile device architecture that may be used to realize a specialized system implementing the present teaching in accordance with various embodiments.

FIG. 24 is an illustrative diagram of an exemplary mobile device architecture that may be used to realize a specialized system implementing at least some parts of the present teaching in accordance with various embodiments. In this example, the user device on which the present teaching is implemented corresponds to a mobile device 2400, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 2400 may include one or more central processing units ("CPUs") 2440, one or more graphic processing units ("GPUs") 2430, a display 2420, a memory 2460, a communication platform 2410, such as a wireless communication module, storage 2490, and one or more input/output (I/O) devices 2440. Any other suitable component, including but not limited to a system bus or a controller (not shown), may also be included in the mobile device 2400. As shown in FIG. 24 a mobile operating system 2470 (e.g., iOS, Android, Windows Phone, etc.), and one or more applications 2480 may be loaded into memory 2460 from storage 2490 in order to be executed by the CPU 2440. The applications 2480 may include a browser or any other suitable mobile apps for managing a conversation system on mobile device 2400. User interactions may be achieved via the I/O devices 2440 and provided to the automated dialogue companion via network(s) 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 25:
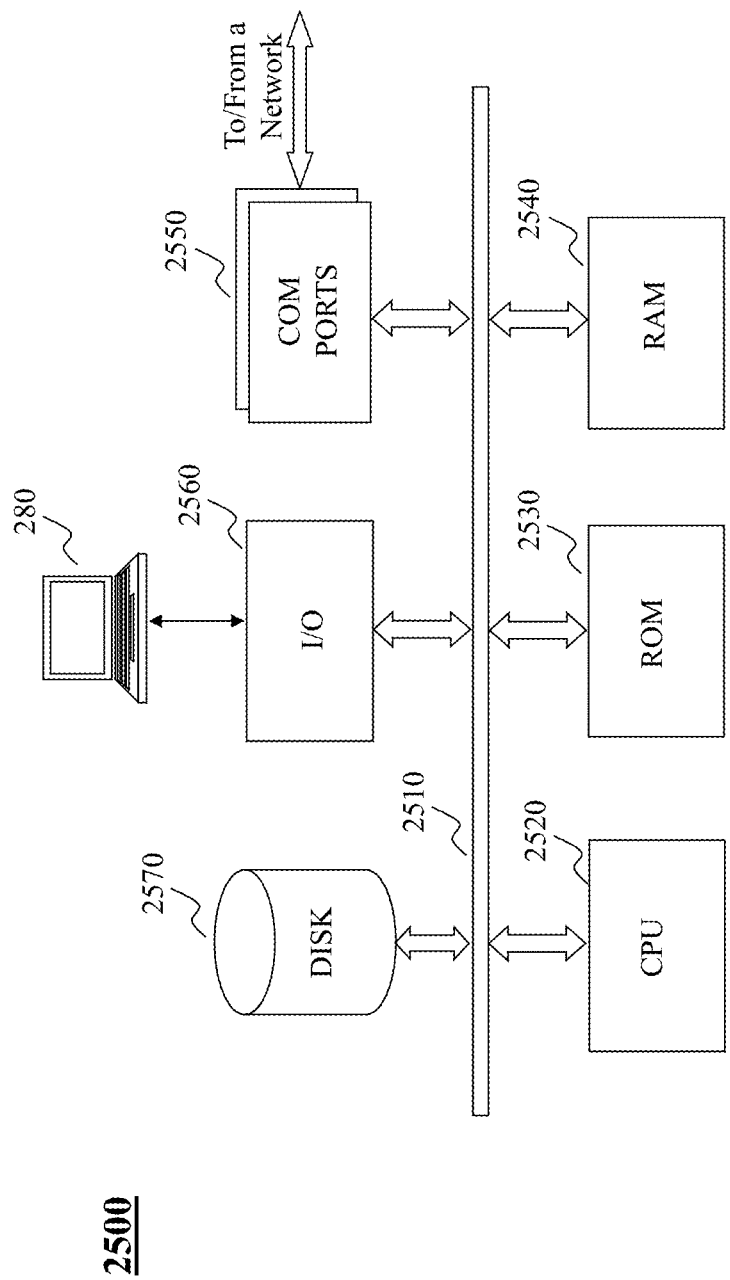
FIG. 25 is an illustrative diagram of an exemplary computing device architecture that may be used to realize a specialized system implementing the present teaching in accordance with various embodiments.

FIG. 25 is an illustrative diagram of an exemplary computing device architecture that may be used to realize a specialized system implementing at least some parts of the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 2500 may be used to implement any component of conversation or dialogue management system, as described herein. For example, conversation management system may be implemented on a computer such as computer 2500, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 2500, for example, includes COM ports 2550 connected to and from a network connected thereto to facilitate data communications. Computer 2500 also includes a central processing unit (CPU) 2520, in the form of one or more processors, for executing program instructions. The exemplary computer platform includes an internal communication bus 2510, program storage and data storage of different forms (e.g., disk 2570, read only memory (ROM) 2530, or random access memory (RAM) 2540), for various data files to be processed and/or communicated by computer 2500, as well as possibly program instructions to be executed by CPU 2520. Computer 1300 also includes an I/O component 2560, supporting input/output flows between the computer and other components therein such as user interface elements 2580. Computer 2500 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on at least one machine including at least one processor, memory, and communication platform capable of connecting to a network for managing a user machine dialogue, the method comprising:
  receiving, at a server, a request from a device for a response for answering an utterance of a user engaged in a dialogue with the device, wherein the request includes information related to a current state of the dialogue;
  determining, by the server, the response based on a dialogue tree residing on the server, the utterance, and the current state of the dialogue, wherein the dialogue tree is generated, prior to the dialogue, with predicted content of dialogues;
  creating, by the server for the device, a sub-dialogue tree that corresponds to a portion of the dialogue tree carved out in accordance with the determined response, wherein the sub-dialogue tree predicts future content of the dialogue;
  generating, by the server for the device, a local dialogue manager with respect to the sub-dialogue tree, wherein the local dialogue manager is created to drive, on the device without involving the server, the dialogue based on the predicted future content of the dialogue represented by the updated local sub-dialogue tree; and
  sending the response, the sub-dialogue tree, and the local dialogue manager to the device in response to the request, wherein the sub-dialogue tree and the local dialogue manager are to be deployed on the device and the local dialogue manager controls the dialogue with the user on the device based on the sub-dialogue tree.

2. The method of claim 1, wherein the information related to the current state of the dialogue includes at least one of content of the utterance of the user, an observation of the dialogue surrounding, and a characterization of the observation.

3. The method of claim 2, wherein
  the observation of the dialogue surrounding includes an observation of at least one of the user and a scene of the dialogue;
  the observation of the user includes one or more of a facial expression, a gesture, a motion of the user, and a tone of the utterance; and
  the observation of the scene of the dialogue includes one or more of an object present at the scene and a sound in the scene of the dialogue.

4. The method of claim 3, wherein
  the characterization of the observation of the user includes an estimated emotional state and/or an estimated intent of the user; and
  the characterization of the observation of the scene includes a spatial relationship among different objects in the scene and an estimated type of the sound in the scene.

5. The method of claim 1, wherein the step of generating the response comprises:
  accessing a node of the dialogue tree corresponding to the current state of the dialogue;
  determining a plurality of sub-nodes associated with the node;
  selecting a sub-node as the response from the plurality of sub-nodes as the response based on one or more criteria.

6. The method of claim 1, wherein the step of creating a sub-dialogue tree comprises:
  identifying a node in the dialogue tree that corresponds to the response;
  determining the portion of the dialogue tree with respect to the node based on parameters associated with the device; and
  generating the sub-dialogue tree based on the portion determined.

7. The method of claim 1, further comprising archiving data related to the sub-dialogue tree and the local dialogue manager.

8. Machine readable and non-transitory medium having information recorded thereon for managing a user machine dialogue, wherein the information, when read by the machine, causes the machine to perform:
  receiving, at a server, a request from a device for a response for answering an utterance of a user engaged in a dialogue with the device, wherein the request includes information related to a current state of the dialogue;
  determining, by the server, the response based on a dialogue tree residing on the server, the utterance, and the current state of the dialogue, wherein the dialogue tree is generated, prior to the dialogue, with predicted content of dialogues;
  creating, by the server for the device, a sub-dialogue tree that corresponds to a portion of the dialogue tree carved out in accordance with the determined response, wherein the sub-dialogue tree predicts future content of the dialogue;

generating, by the server for the device, a local dialogue manager with respect to the sub-dialogue tree, wherein the local dialogue manager is created to drive, on the device without involving the server, the dialogue based on the predicted future content of the dialogue represented by the updated local sub-dialogue tree; and sending the response, the sub-dialogue tree, and the local dialogue manager to the device in response to the request, wherein the sub-dialogue tree and the local dialogue manager are to be deployed on the device and the local dialogue manager controls the dialogue with the user on the device based on the sub-dialogue tree.

9. The medium of claim 8, wherein the information related to the current state of the dialogue includes at least one of content of the utterance of the user, an observation of the dialogue surrounding, and a characterization of the observation.

10. The medium of claim 9, wherein
the observation of the dialogue surrounding includes an observation of at least one of the user and a scene of the dialogue;
the observation of the user includes one or more of a facial expression, a gesture, a motion of the user, and a tone of the utterance; and
the observation of the scene of the dialogue includes one or more of an object present at the scene and a sound in the scene of the dialogue.

11. The medium of claim 10, wherein
the characterization of the observation of the user includes an estimated emotional state and/or an estimated intent of the user; and
the characterization of the observation of the scene includes a spatial relationship among different objects in the scene and an estimated type of the sound in the scene.

12. The medium of claim 8, wherein the step of generating the response comprises:
accessing a node of the dialogue tree corresponding to the current state of the dialogue;
determining a plurality of sub-nodes associated with the node;
selecting a sub-node as the response from the plurality of sub-nodes as the response based on one or more criteria.

13. The medium of claim 8, wherein the step of creating a sub-dialogue tree comprises:
identifying a node in the dialogue tree that corresponds to the response;
determining the portion of the dialogue tree with respect to the node based on parameters associated with the device; and
generating the sub-dialogue tree based on the portion determined.

14. A system for managing a user machine dialogue, comprising:
a device interface unit at a server implemented on a processor and configured for receiving a request from a device for a response for answering an utterance of a user engaged in a dialogue with the device, wherein the request includes information related to a current state of the dialogue;
a dialogue manager (DM) of the server implemented on a processor and configured for determining the response based on a dialogue tree residing on the server, the utterance, and the current state of the dialogue, wherein the dialogue tree is generated, prior to the dialogue, with predicted content of dialogues;

an updated local dialogue tree (DT) determiner of the server implemented on a processor and configured for creating, for the device, a sub-dialogue tree that corresponds to a portion of the dialogue tree carved out in accordance with the determined response, wherein the sub-dialogue tree predicts future content of the dialogue; and an updated local dialogue manager (DM) determiner of the server implemented on a processor and configured for generating, by the server for the device, a local dialogue manager with respect to the sub-dialogue tree, wherein the local dialogue manager is created to drive, on the device without involving the server, the dialogue based on the predicted future content of the dialogue represented by the updated local sub-dialogue tree, wherein the device interface unit is further configured for sending the response, the sub-dialogue tree, and the local dialogue manager to the device in response to the request, wherein the sub-dialogue tree and the local dialogue manager are to be deployed on the device and the local dialogue manager controls the dialogue with the user on the device based on the sub-dialogue tree.

15. The system of claim 14, wherein the information related to the current state of the dialogue includes at least one of content of the utterance of the user, an observation of the dialogue surrounding, and a characterization of the observation.

16. The system of claim 15, wherein
the observation of the dialogue surrounding includes an observation of at least one of the user and a scene of the dialogue;
the observation of the user includes one or more of a facial expression, a gesture, a motion of the user, and a tone of the utterance; and
the observation of the scene of the dialogue includes one or more of an object present at the scene and a sound in the scene of the dialogue.

17. The system of claim 16, wherein
the characterization of the observation of the user includes an estimated emotional state and/or an estimated intent of the user; and
the characterization of the observation of the scene includes a spatial relationship among different objects in the scene and an estimated type of the sound in the scene.

18. The system of claim 14, wherein the dialogue manager generates the response by:
accessing a node of the dialogue tree corresponding to the current state of the dialogue;
determining a plurality of sub-nodes associated with the node;
selecting a sub-node as the response from the plurality of sub-nodes as the response based on one or more criteria.

19. The system of claim 14, wherein the updated local DT determiner creates the sub-dialogue tree by:
identifying a node in the dialogue tree that corresponds to the response;
determining the portion of the dialogue tree with respect to the node based on parameters associated with the device; and
generating the sub-dialogue tree based on the portion determined.

20. The system of claim 14, further comprising a local DM/DT generator implemented on a processor and configured for archiving data related to the sub-dialogue tree and the local dialogue manager.

* * * * *